(12) United States Patent
Goto et al.

(10) Patent No.: US 8,819,580 B2
(45) Date of Patent: Aug. 26, 2014

(54) TERMINAL APPARATUS AND PROCESSING PROGRAM THEREOF

(75) Inventors: Yoshihiro Goto, Hamura (JP); Mitsuru Hamada, Tachikawa (JP)

(73) Assignee: NEC Corporation, Tokyo (JP)

( * ) Notice: Subject to any disclaimer, the term of this patent is extended or adjusted under 35 U.S.C. 154(b) by 1045 days.

(21) Appl. No.: 12/012,895

(22) Filed: Feb. 6, 2008

(65) Prior Publication Data
US 2008/0218533 A1    Sep. 11, 2008

(30) Foreign Application Priority Data

Mar. 6, 2007  (JP) ................................ 2007-055628

(51) Int. Cl.
*G06F 3/048*  (2013.01)
*G06F 3/00*   (2006.01)

(52) U.S. Cl.
USPC ........... 715/788; 715/764; 715/765; 715/778; 715/783; 715/792; 715/794

(58) Field of Classification Search
USPC .......... 715/764, 765, 778, 783, 788, 792, 794
See application file for complete search history.

(56) References Cited

U.S. PATENT DOCUMENTS

| | | | |
|---|---|---|---|
| 6,016,438 A * | 1/2000 | Wakayama | 600/410 |
| 6,108,573 A * | 8/2000 | Debbins et al. | 600/410 |
| 6,111,573 A * | 8/2000 | McComb et al. | 715/763 |
| 6,182,127 B1 * | 1/2001 | Cronin et al. | 709/219 |
| 6,510,459 B2 * | 1/2003 | Cronin et al. | 709/219 |
| 7,034,860 B2 * | 4/2006 | Lia et al. | 348/14.09 |
| 7,417,644 B2 * | 8/2008 | Cooper et al. | 345/619 |
| 7,657,281 B2 * | 2/2010 | Eibye | 455/550.1 |
| 2004/0095401 A1 | 5/2004 | Tomimori | |
| 2004/0230940 A1 * | 11/2004 | Cooper et al. | 717/100 |
| 2005/0091596 A1 * | 4/2005 | Anthony et al. | 715/712 |
| 2005/0228250 A1 * | 10/2005 | Bitter et al. | 600/407 |

(Continued)

FOREIGN PATENT DOCUMENTS

| | | |
|---|---|---|
| CN | 1276340 | 9/2006 |
| JP | 05-346998 | 12/1993 |

(Continued)

OTHER PUBLICATIONS

Matsuoka, Windows Vista Jyouhou Mo Keisai! Kiwame No windows Tune Up (Information of Windows Vista is also included! Extreme Windows Tune Up); PC Japan, Jan. 1, 2007, pp. P120-P123, vol. 12, No. 1, Softbank Creative Corp. Published in Japan (with English outline attached).

*Primary Examiner* — Nicholas Augustine
(74) *Attorney, Agent, or Firm* — Cozen O'Connor

(57) ABSTRACT

In the terminal apparatus, a CPU 100 reads out a simultaneous/switch display condition that is currently employed from display control table information stored in a simultaneous/switch display condition memory section 102c, and identifies whether a screen display instruction operation instructs a switch display or a simultaneous display in accordance with the simultaneous/switch display condition that has been read out and the circumstance when the screen display instruction operation is performed. When the screen display instruction operation is identified as instructing the simultaneous display, the CPU 100 reads out the display layout condition that is currently employed from display layout table information stored in a display layout condition memory section 102d, and controls a display layout for the simultaneous display in accordance with the display layout condition that has been read out and the circumstance when the screen display instruction operation is performed.

5 Claims, 16 Drawing Sheets

(56) References Cited

U.S. PATENT DOCUMENTS

| | | | |
|---|---|---|---|
| 2005/0251021 A1* | 11/2005 | Kaufman et al. | 600/407 |
| 2006/0013462 A1* | 1/2006 | Sadikali | 382/132 |
| 2006/0123360 A1* | 6/2006 | Anwar et al. | 715/810 |
| 2006/0290661 A1* | 12/2006 | Innanen et al. | 345/156 |
| 2007/0150810 A1* | 6/2007 | Katz et al. | 715/526 |
| 2008/0125180 A1* | 5/2008 | Hoffman et al. | 455/566 |
| 2009/0227279 A1 | 9/2009 | Yuki et al. | |

FOREIGN PATENT DOCUMENTS

| | | |
|---|---|---|
| JP | 09-128134 | 5/1997 |
| JP | 2000-242257 | 9/2000 |
| JP | 2002-091655 | 3/2002 |
| JP | 2002-244798 | 8/2002 |
| JP | 2006-148316 | 6/2006 |
| KR | 2003-0054620 | 7/2003 |
| KR | 2005-0089362 | 9/2005 |
| KR | 2006-0123179 | 12/2006 |

* cited by examiner

FIG. 3

| SCREEN ID | SCREEN (FUNCTION) | PRIORITY ORDER | GROUP |
|---|---|---|---|
| 01 | ADDRESS BOOK | 2 | CHARACTER OUTPUT |
| 02 | OUTGOING CALL HISTORY | 8 | CHARACTER OUTPUT |
| 03 | INCOMING CALL HISTORY | 7 | CHARACTER OUTPUT |
| 04 | DIGITAL TELEVISION | 1 | IMAGE OUTPUT |
| 05 | DIGITAL RADIO | 6 | VOICE OUTPUT |
| 06 | E-MAIL | 3 | CHARACTER OUTPUT |
| 07 | MOVIE REPLAY | 5 | IMAGE OUTPUT |
| 08 | MUSIC REPLAY | 4 | VOICE OUTPUT |
| ... | ... | ... | ... |

FIG. 4

| DATE AND TIME | SCREEN ON DISPLAY | DISPLAY INSTRUCTION SCREEN | DISPLAY CONTROL | DISPLAY LAYOUT |
|---|---|---|---|---|
| 2007/10/10 10:40 | DIGITAL TELEVISION | ADDRESS BOOK | SIMULTANEOUS DISPLAY | PATTERN 2 |
| 2007/10/10 10:30 | — | DIGITAL TELEVISION | SWITCH DISPLAY | PATTERN 1 |
| 2007/10/10 10:20 | E-MAIL | DIGITAL TELEVISION | SIMULTANEOUS DISPLAY | PATTERN 2 |
| 2007/10/10 10:10 | E-MAIL | DIGITAL TELEVISION | SIMULTANEOUS DISPLAY | PATTERN 3 |
| 2007/10/10 10:00 | — | E-MAIL | SWITCH DISPLAY | PATTERN 1 |
| ... | ... | ... | ... | ... |

FIG. 5

| SET FLAG | SIMULTANEOUS/ SWITCH DISPLAY CONDITION | | DISPLAY CONTROL |
|---|---|---|---|
| 0 | OPERATION TIME | LESS THAN 1 SECOND | SWITCH DISPLAY |
| 0 | OPERATION TIME | 1 SECOND OR MORE | SIMULTANEOUS DISPLAY |
| 1 | NUMBER OF OPERATIONS | ONCE | SWITCH DISPLAY |
| 1 | NUMBER OF OPERATIONS | TWICE OR MORE | SIMULTANEOUS DISPLAY |
| 0 | PRIORITY ORDER | PRIORITY ORDER OF SCREEN FOR WHICH DISPLAY INSTRUCTION IS HIGHER | SWITCH DISPLAY |
| 0 | PRIORITY ORDER | PRIORITY ORDER OF SCREEN FOR WHICH DISPLAY INSTRUCTION IS LOWER | SIMULTANEOUS DISPLAY |
| 0 | GROUP | SAME | SWITCH DISPLAY |
| 0 | GROUP | DIFFERENT | SIMULTANEOUS DISPLAY |
| 0 | DISPLAY HISTORY | IN ACCORDANCE WITH "SWITCH DISPLAY/SIMULTANEOUS DISPLAY" IN PREVIOUS DISPLAY OF SCREEN FOR WHICH DISPLAY INSTRUCTION IS MADE | |
| 0 | CONNECTION TO CHARGING APPARATUS | NON-CONNECTED | SWITCH DISPLAY |
| 0 | CONNECTION TO CHARGING APPARATUS | CONNECTED | SIMULTANEOUS DISPLAY |
| 0 | PACKAGE STYLE | VIEW STYLE | SWITCH DISPLAY |
| 0 | PACKAGE STYLE | OPEN STYLE | SIMULTANEOUS DISPLAY |

FIG. 6

| SET FLAG | DISPLAY LAYOUT CONDITION | | DISPLAY LAYOUT CONTROL |
|---|---|---|---|
| 0 | OPERATION TIME | LESS THAN 2 SECONDS | PATTERN 2 |
| | | 2 SECONDS OR MORE | PATTERN 3 |
| 0 | NUMBER OF OPERATIONS | TWICE OR LESS | PATTERN 3 |
| | | THREE TIMES OR MORE | PATTERN 4 |
| 1 | PRIORITY ORDER | PRIORITY ORDER OF SCREEN FOR WHICH DISPLAY INSTRUCTION IS HIGHER OR LOWER BY 1 RANK | PATTERN 2 |
| | | PRIORITY ORDER OF SCREEN FOR WHICH DISPLAY INSTRUCTION IS LOWER BY 2 RANKS OR MORE | PATTERN 3 |
| 0 | GROUP | SCREEN FOR WHICH DISPLAY INSTRUCTION IS MADE BELONGS TO IMAGE OUTPUT GROUP | PATTERN 2 |
| | | SCREEN FOR WHICH DISPLAY INSTRUCTION IS MADE BELONGS TO VOICE OUTPUT GROUP | PATTERN 4 |
| | | SCREEN FOR WHICH DISPLAY INSTRUCTION IS MADE BELONGS TO OTHER GROUP | PATTERN 3 |
| 0 | DISPLAY HISTORY | IN ACCORDANCE WITH "DISPLAY PATTERN" IN PREVIOUS DISPLAY OF SCREEN FOR WHICH DISPLAY INSTRUCTION IS MADE | |
| 0 | CONNECTION TO CHARGING APPARATUS | NON-CONNECTED | PATTERN 2 |
| | | CONNECTED | PATTERN 4 |
| 0 | PACKAGE STYLE | VIEW STYLE | PATTERN 3 |
| | | OPEN STYLE | PATTERN 4 |

PATTERN 1 (SWITCH DISPLAY)

PATTERN 2

PATTERN 3

PATTERN 4

TERMINAL APPARATUS AND PROCESSING PROGRAM THEREOF

CROSS-REFERENCE TO RELATED APPLICATION

This application is based upon and claims the benefit of priority from the prior Japanese Patent Application No. 2007-055628, filed Mar. 6, 2007, the entire contents of which is incorporated herein by reference.

BACKGROUND OF THE INVENTION

1. Field of the Invention

The present invention relates to a terminal apparatus and a processing program thereof that can control a display mode of a screen easily and suitably.

2. Description of the Related Art

Conventionally, a terminal apparatus (for example, a mobile terminal, a digital camera) that displays a plurality of screens simultaneously or displays a single screen is known. Such terminal apparatus involves a need to instruct by a user operation whether to display a plurality of screens simultaneously or displaying a new screen switching from the screen on display, when a display instruction of a new screen is made while a certain screen is being displayed. As a conventional prior art of this type, for example, an apparatus is disclosed in Japanese Laid-Open (Kokai) Patent Publication No. 05-346998 that sequentially displays monitor screens in windows that are stored in a screen memory when a screen guide request is inputted, and that displays the requested monitor screen switching from the monitor screen that is currently being displayed when a screen switch request is inputted.

In the mean time, in the conventional prior art disclosed in Japanese Laid-Open (Kokai) Patent Publication No. 05-346998 as described above, if the user wants to further display a plurality of screens simultaneously, the user must specify the display layout of the plurality of screens by the user operation. In other words, since the user must operate every time when instructing whether to display the screens simultaneously or to display a new screen by switching, or when instructing the display layout, such bothering operation puts a burden on the user. In other words, the conventional prior art has a drawback that the display mode of the screen cannot be controlled easily and suitably.

SUMMARY OF THE INVENTION

The present invention has been conceived in light of the foregoing situations, and is to provide a terminal apparatus and a processing program thereof that controls a display mode of a screen easily and suitably.

In order to achieve the above-described purpose, in accordance with one aspect of the present invention, there is provided a terminal apparatus provided with a display means that displays a plurality of screens simultaneously, comprising: an instruction means for generating a display instruction of a first screen in accordance with an operation; an identification means for, when the instruction means generates the display instruction while the display means is displaying a second screen, identifying a display mode of the display means based on operation circumstance when the display instruction is generated; and a display control means for controlling the display means so as to display the first screen and/or the second screen in the display mode identified by the identification means.

In accordance with another aspect of the present invention, there is provided a terminal apparatus provided with a display means that displays a plurality of screens simultaneously, comprising: an instruction means for generating a display instruction of a first screen; an identification means for, when the instruction means generates the display instruction while the display means is displaying a second screen, identifying a display mode of the display means based on a circumstance of the first screen and the second screen; and a display control means for controlling the display means so as to display the first screen and/or the second screen in the display mode identified by the identification means.

In accordance with another aspect of the present invention, there is provided a terminal apparatus provided with a display means that displays a plurality of screens simultaneously, comprising: an instruction means for generating a display instruction of a first screen; an identification means for, when the instruction means generates the display instruction while the display means is displaying a second screen, identifying a display mode of the display means based on a circumstance of the terminal apparatus; and a display control means for controlling the display means so as to display the first screen and/or the second screen in the display mode identified by the identification means.

According to the present invention, the display mode of the screen of the terminal apparatus can be controlled easily and suitably.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3 shows an example of a data structure of screen information stored in a screen information memory section 102a that is provided in a RAM 102;

FIG. 4 shows an example of a data structure of display history information stored in a display history memory section 102b that is provided in the RAM 102;

FIG. 5 shows an example of a data structure of display control table information stored in a simultaneous/switch display condition memory section 102c that is provided in the RAM 102;

FIG. 6 shows an example of a data structure of display layout table information stored in a display layout condition memory section 102d that is provided in the RAM 102;

DETAILED DESCRIPTION OF THE PREFERRED EMBODIMENTS

The present invention will be hereinafter described in detail with reference to the preferred embodiments shown in the accompanying drawings.

A. Structure of Embodiment

A-1. System Structure

Figure 1:
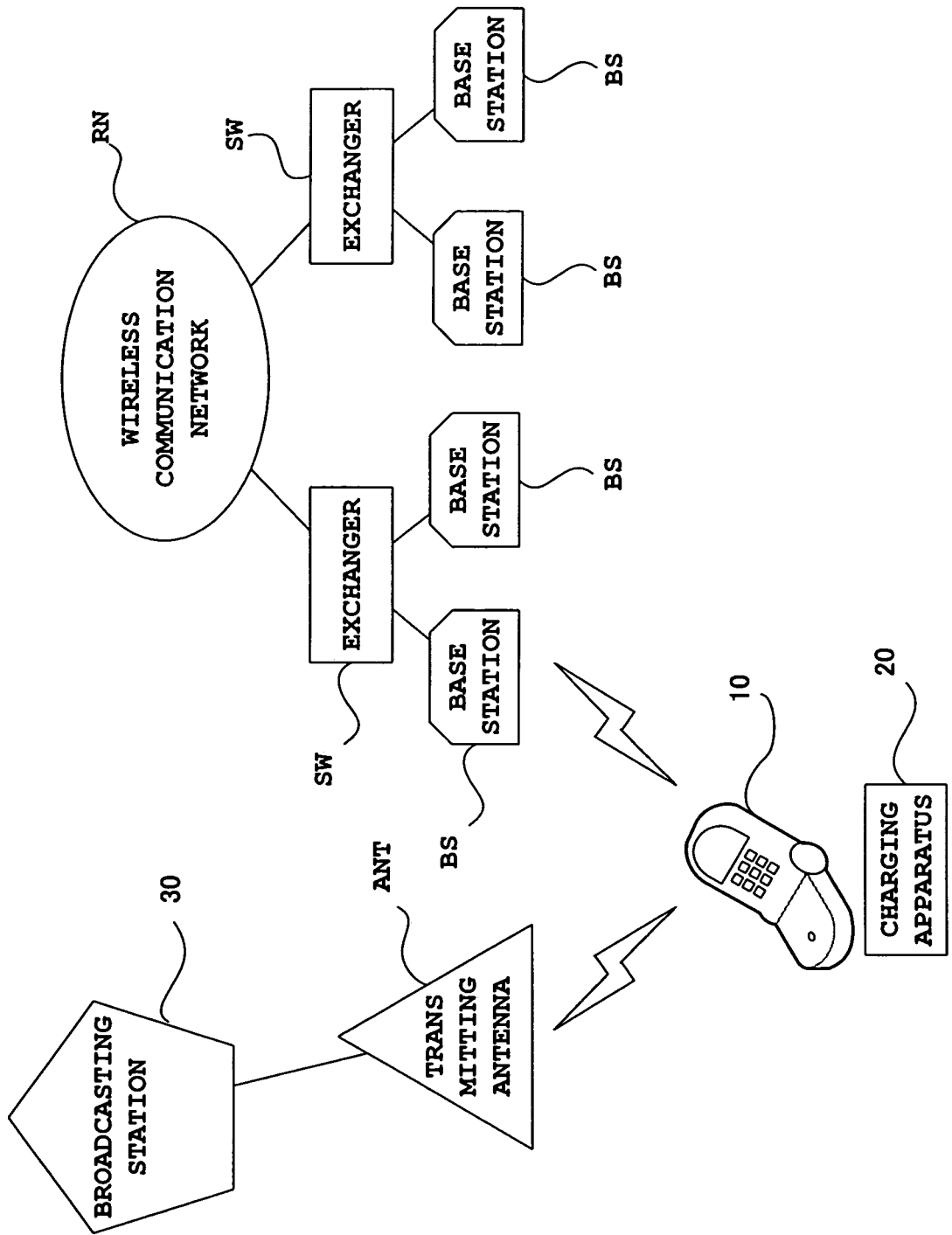
FIG. 1 is a system structure diagram for explaining an outline of a function of a mobile terminal 10 according to an embodiment of the present invention.

FIG. 1 is a system structure diagram for explaining an outline of major functions of a mobile terminal 10 (terminal apparatus) according to an embodiment of the present invention has.

In FIG. 1, the mobile terminal 10 has a mobile wireless communication function and an e-mail transmission and reception function. When a call is made using the mobile wireless communication function, the mobile terminal 10 initiates a call to an exchanger SW on the transmission side via a base station BS which has its position registered. Responding to the initiated call, the exchanger SW on the transmission side calls an exchanger SW on the reception side based on an incoming number (subscriber number) inquired from a subscriber registration server (not shown) that is provided in a wireless communication network RN and on registered positional information. The exchanger SW on the reception side calls a mobile terminal 10 (not shown) on the reception side via a base station BS on the reception side. When the mobile terminal 10 on the reception side makes an incoming call reply responding to this, a link is established between the exchanger SW on the transmission side and the exchanger SW on the reception side, whereby a telephone call is enabled.

E-mail transmitted from the mobile terminal 10 using the e-mail transmission and reception function is transmitted to an e-mail server (not shown) on the Internet via the base station BS, the exchanger SW and a gateway server (not shown) that is provided in the wireless communication network. The e-mail server should transmit e-mail to the mobile terminal 10 that has an e-mail address of the destination in the route opposite to the route as described above.

In addition, the mobile terminal 10 has a function of receiving and outputting a digital television broadcast signal and a digital radio broadcast signal that are transmitted from a transmitting antenna ANT of a broadcasting station 30. Furthermore, the mobile terminal 10 also has a function of controlling a mode of a screen display in the state where it is set on a charging apparatus 20 and a battery is being charged. In addition, the mobile terminal 10 also has an address book function of editing and managing an address list, and a function of replaying movie data and music data.

A-2. Structure of Mobile Terminal 10

Figure 2:
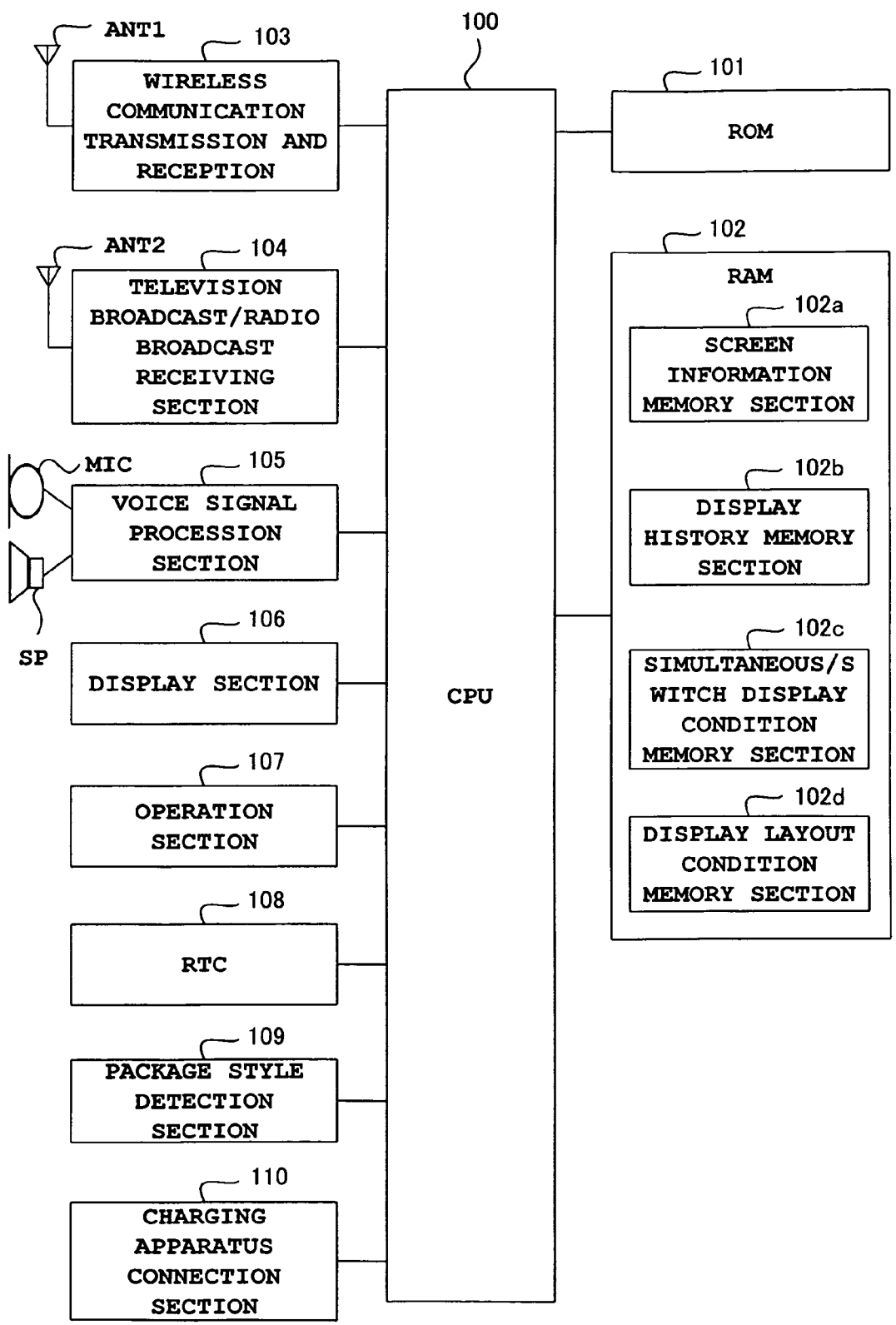
FIG. 2 is a block diagram showing a structure of the mobile terminal 10.

Next, the structure of the mobile terminal 10 will be described with reference to FIG. 2. In FIG. 2, a CPU 100 controls operations at individual sections in accordance with an event that is supplied from an operation section 107 (which will be described later). Characteristic processing operation of the CPU 100 related to the summary of the present invention will be described later in details.

A ROM 101 includes a program area and a data area. Various programs that are executed by the CPU 100 are stored in the program area of the ROM 101. The various programs referred herein include not only a main routine, simultaneous/switch display identification processing and display layout identification processing to be described later in details, but also application programs for realizing the various functions as previously described. The data area of the ROM 101 stores not only control data to be monitored by a predetermined program but also various screen data that configure an idle screen or the like. A RAM 102 (memory means) includes a screen information memory section 102a, a display history memory section 102b, a simultaneous/switch display condition memory section 102c and a display layout condition memory section 102d.

The screen information memory section 102a stores screen information representing an attribute for each screen that is assigned for each function the mobile terminal 10 has. FIG. 3 shows one exemplary configuration of the screen information that is stored in the screen information memory section 102a. In this example shown in the diagram, the screen information consists of "a screen ID" that identifies the screen, "a screen (function)" that represents a function that is aligned with the screen ID, "a priority order" that represents priority in display on the screen and "a group" that is classified depending on what to output (character, image, voice and the like).

Note that, in this example, the screen and the function are aligned with each other in accordance with one-to-one correspondence to simplify the description. However, the alignment is not limited to this, and it is obviously possible to assign a plurality of screens to a single function. For example, the screen that displays a list of the names of individuals registered in the address book may be different from the screen that displays personal information in detail. Furthermore, it is also obviously possible to classify the group depending on specification by the user or the like, rather than by the data to be outputted.

The display history memory section 102b stores display history information, which represents the contents of the screens that have been displayed, for several previous displays. FIG. 4 shows one exemplary structure of the display history information that is stored in the display history memory section 102b. In this example shown in the diagram, the display history information consists of "date and time" when the screen was displayed, "screen on display", "display instruction screen", "display control" and "display layout".

Hereinafter, what "screen on display", "display instruction screen", "display control" and "display layout" that configure the display history information are meant by will be described with reference to FIG. 7 and FIG. 8A to FIG. 8D.

Figure 7:
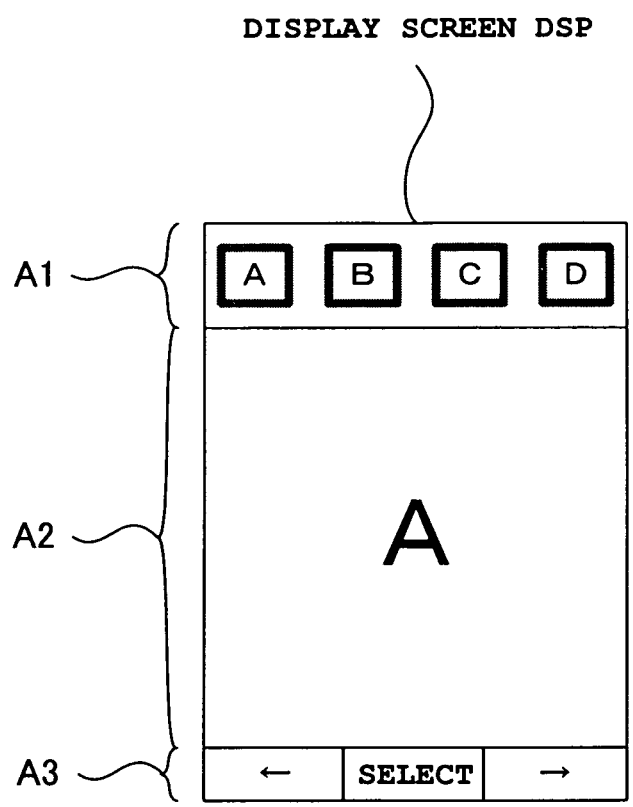
FIG. 7 is a diagram for explaining a display area of a display screen DSP that is displayed on the display section 106.

First of all, FIG. 7 shows the structure of a display screen DSP that the display section 106, to be described later, has. As shown in the diagram, the display screen DSP is roughly divided into a display area A1, a display area A2 and a display area A3. A function-corresponding key is displayed for guidance in the display area A3. Specifically, in the example shown in FIG. 7, the following information is displayed for guidance: the functional key switches that are located so as to correspond to the portions displayed as "←" and "→" are equivalent to the cursor switches for moving the cursor in the horizontal direction and the functional key switch that is located so as to correspond to the portion displayed as "selection" is equivalent to the selection switch.

Icons that represent functions that are running (application programs) are displayed in the display area A1. FIG. 7 shows an example in which icons A to D representing 4 functions that are running, respectively. One of the icons A to D is selected by the operation of the function-corresponding key that is displayed for guidance in the display area A3 as described above.

In the display area A2, one of the screen on display or the display instruction screen is displayed by changeover, or both the screen on display and the display instruction screen are displayed simultaneously, in accordance with a display layout for a pattern selected from the display layouts for patterns 1 to 4 that are shown respectively in FIG. 8A to FIG. 8D and a mode of the display control to be specified.

The screen on display herein refers to the first screen that is displayed in the display area A2. The display instruction screen refers to the screen which is displayed in the display area A2 by means of a function that is newly activated in accordance with selection of the icon in the display area A1. The display control refers to one of the following display modes: one is a switch display of switching into one of the screen on display or the display instruction screen and displaying it in the display area A2, the other is a simultaneous display of displaying the screen on display and the display instruction screen simultaneously in the display area A2.

Figure 8A:
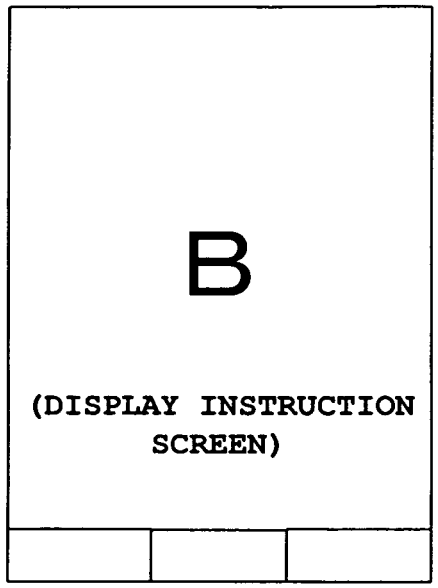
FIG. 8A, FIG. 8B, FIG. 8C and FIG. 8D show display layouts for patterns 1 to 4, respectively.

Specifically, as shown in the example in FIG. 7, when the icon B is selected in the display area A1 and the switch display shown in pattern 1 is performed in the state where the screen on display A is displayed in the display area A2, the display instruction screen B will be displayed in the display area A2 in accordance with the display layout shown in FIG. 8A. The display instruction screen B should be displayed by means of a function that is newly activated in accordance with the selection of the icon B.

Figure 8B:
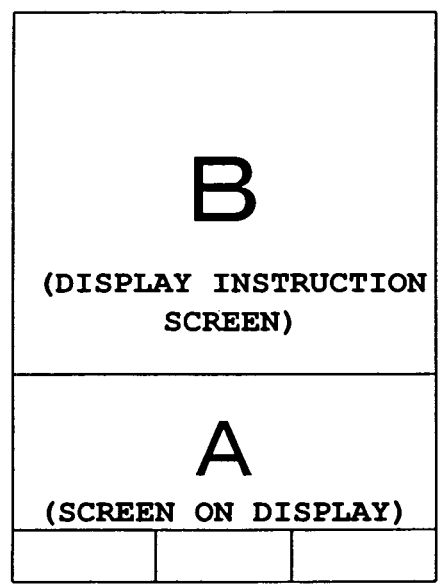

Alternatively, when the icon B is selected in the display area A1 and the simultaneous display shown in the pattern 2 is performed in the state where the screen on display A is displayed in the display area A2, the display instruction screen B will be displayed in the upper ⅔ portion of the display area A2 and the screen on display A will be displayed in the lower ⅓ portion of the display area A2 in accordance with the display layout shown in FIG. 8B. The display instruction screen B should be displayed by means of a function that is newly activated in accordance with the selection of the icon B.

Figure 8C:
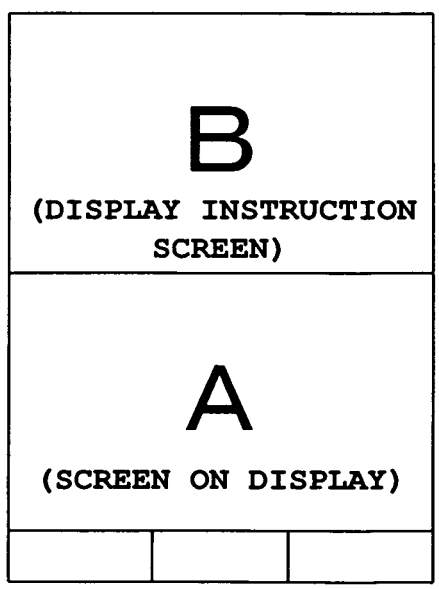

Furthermore, when the icon B is selected in the display area A1 and the simultaneous display shown in the pattern 3 is performed in the state where the screen on display A is displayed in the display area A2, the display instruction screen B will be displayed in the upper half portion of the display area A2, and the screen on display A will be displayed in the lower half portion of the display area A2 in accordance with the display layout shown in FIG. 8C. The display instruction screen B should be shown by means of a function that is newly activated in accordance with the selection of the icon B.

Figure 8D:
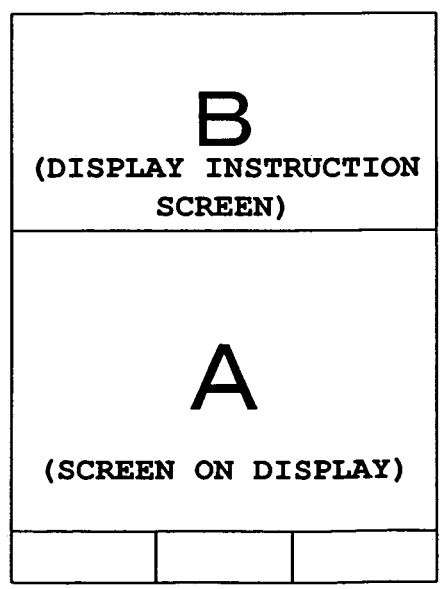

Alternatively, when the icon B is selected in the display area A1 and the simultaneous display shown in the pattern 4 is performed in the state where the screen on display A is displayed in the display area A2, the display instruction screen B will be displayed in the upper ⅓ portion of the display area A2 and the screen on display A will be displayed in the lower ⅔ portion of the display area A2 in accordance with the display layout shown in FIG. 8D. The display instruction screen B should be displayed by means of a function that is newly activated in accordance with the selection of the icon B.

As described above, "the screen on display" in the display history information that is stored in the display history memory section 102b refers to the first screen that is displayed in the display area A2. "The display instruction screen" in the display history information refers to the screen which is displayed in the display area A2 by means of a function that is newly activated in accordance with the icon selection in the display area A1. "The display control" in the display history information represents whether the display is the switch display of the screen on display and the display instruction screen or the simultaneous display of the screen on display and the display instruction screen. "The display layout" in the display history information represents one of the patterns 1 to 4 that are respectively shown in FIG. 8A to FIG. 8D.

Note that the display layout shown in FIG. 8A to FIG. 8D is merely an example. It is also obviously possible to provide various variations. For example, the display area A2 may be divided into 4 (i.e., 2×2) regions, in other words, into respective 2 regions in the vertical direction and the lateral direction, and the screen on display and the three display instruction screens may be assigned and simultaneously displayed.

Next, the structure of the mobile terminal 10 will be described referring back to FIG. 2.

In FIG. 2, the simultaneous/switch display condition memory section 102c that is provided in the RAM 102 stores the display control table information. The display control table information consists of set flags to be provided so as to correspond to a plurality of simultaneous/switch display conditions and display control data, and is monitored in the simultaneous/switch display identification processing (which will be described later) that is executed by the CPU 100.

An example of the display control table information that is stored in the simultaneous/switch display condition memory section 102c will now be described with reference to FIG. 5. In the display control table information shown in the drawing, "operation time", "number of operations", "priority order", "group", "display history", "connection to charging apparatus" and "package style" are defined as the simultaneous/switch display condition. What is the simultaneous/switch display conditions meant by will be described later.

The set flag is a flag that is provided for each of the simultaneous/switch display conditions. The flag is set at "1" when the condition corresponds to the simultaneous/switch display condition that has been selected by the user, and at "0" for other cases. That is, the set flag represents the simultaneous/switch display condition that is currently employed. In the example shown in FIG. 5, it is shown that "the number of operations" is selected as the simultaneous/switch display condition. The display control data instructs one of the display modes, that is, the switch display or the simultaneous display in accordance with the simultaneous/switch display condition. For example, in the case where the simultaneous/switch display condition is "number of operations", when the screen display instruction operation is performed once, the switch display will be instructed, and when the screen display instruction operation is performed twice or more, the simultaneous display will be instructed.

The display layout condition memory section 102d of the RAM 102 stores the display layout table information. The display layout table information consists of the set flag to be provided so as to correspond to a plurality of display layout conditions and the display layout control data, and is monitored in the display layout identification processing (which will be described later) that is executed by the CPU 100.

An example of the display layout table information that is stored in the display layout condition memory section 102d will now be described with reference to FIG. 6. In the display layout table information shown in the drawing, "operation time", "number of operations", "priority order", "group", "display history", "connection to charging apparatus" and "package style" are defined as the display layout condition. What display layout conditions are meant by will be described later.

The set flag is a flag that is provided for each of the display layout conditions. The flag is set at "1" when the condition corresponds to the display layout condition that has been selected by the user, and at "0" for other cases. That is, the set flag represents the display layout condition that is currently employed. In the example shown in FIG. 6, it is shown that "the priority order" is selected as the display layout condition. The display layout control data specifies the pattern in accordance with the display layout condition.

For example, assuming that the display layout condition is "the priority order", when "display instruction screen" having a higher priority order than "screen on display" as described previously is to be displayed, or when "display instruction screen" having a lower priority order than "screen on display" by one rank is to be displayed, the display layout for the pattern 2 shown in FIG. 8B will be specified. On the other hand, when "display instruction screen" having a lower priority order than "screen on display" by 2 ranks or more is to be displayed, the display layout for the pattern 3 shown in FIG. 8C will be specified.

Next, the structure of the mobile terminal 10 will be described again referring back to FIG. 2.

In FIG. 2, a wireless communication transmission and reception section 103 transmits and receives the data with the base station BS via an antenna ANT 1 under the control of the CPU 100 at the time of data communication, and outputs voice data that has been received and demodulated via the antenna ANT 1 to the CPU 100 at the time of voice communication, while it amplifies at high frequency a transmission signal that is acquired by modulating the voice data supplied from the CPU 100 and sends the signal from the antenna ANT 1.

A television broadcast/radio broadcast receiving section 104 receives and demodulates a television broadcast signal or a radio broadcast signal via an antenna ANT 2 in accordance with channel selection instructions provided by the CPU 100, and outputs a reception signal (video/television voice data when receiving television broadcast, and radio voice data when receiving radio broadcast) that is acquired by this to the CPU 100.

A voice signal processing section 105, including a speaker SP and a microphone MC, performs digital/analog conversion of voice data supplied from the CPU 100 to a voice signal and generates a sound from the speaker SP, and performs analog/digital conversion of a voice signal outputted from the microphone MC to voice data and supplies the voice data to the CPU 100. In addition, when the television broadcast/radio broadcast section 104 is in the receiving operation, the voice signal processing section 105 performs digital/analog conversion of television voice data or radio voice data that is supplied from the CPU 100 and subsequently amplifies it, and generates a sound from the speaker SP.

The display section 106 (display means), consisting of a color liquid crystal panel and a display driver, displays "screen on display" and "display instruction screen" as described before when describing the various display modes in the display screen DSP (see FIG. 7) under the control of the CPU 100. The operation section 107 has not only various operation keys such as the power switch for turning the power ON and OFF, an off-hook/on-hook switch to be operated at the start/end of a call, and a character input switch that also serves as dial switch, but also various operation buttons or the like for performing a setting operation, a screen display instruction operation, a switch display instruction operation and a display layout change instruction operation. This operation section 107 generates an event in accordance with the operation of the key or the button and outputs the event to the CPU 100. Note that, what the setting operation, the screen display instruction operation, the switch display instruction operation and the display layout change instruction operation are meant by will be described later.

An RTC 108 generates a real time clock which is used for clocking and timer interruption. A package style detection section 109 (style detection means) detects "an open style" or "a view style". "The open style" refers to the state where the user views the display screen DSP of the display section 106 after opening the folding of the mobile terminal 10 that has a package structure of a known folding open/close type. On the other hand, "the view style" refers to the state where the user views the display screen DSP of the display section 106 after folding the package such that the display section 106 faces outwards. When a charging apparatus connecting section 110 (connected state detection means) is electrically connected to a charging terminal of the charging apparatus 20 (see FIG. 1), the charging apparatus connecting section 110 generates a charging apparatus connection detection signal and outputs it to the CPU 100, while charging the battery (not shown).

The CPU 100 herein realizes the functions of instruction means, identification means and display control means.

B. Operation

Next, the operation of the mobile terminal 10 in accordance with the structure as described above will be described.

Hereinafter, the operation of "main routine" of the mobile terminal 10 that is executed by the CPU 100 will be described with reference to FIG. 9 to FIG. 10. Next, the operation of "simultaneous/switch display identification processing" that is called by the main routine will be described with reference to FIG. 11 to FIG. 13, and then the operation of "display layout identification processing" that is called by the main routine will be described with reference to FIG. 14 to FIG. 16.

B-1. Operation of Main Routine

Figure 9:
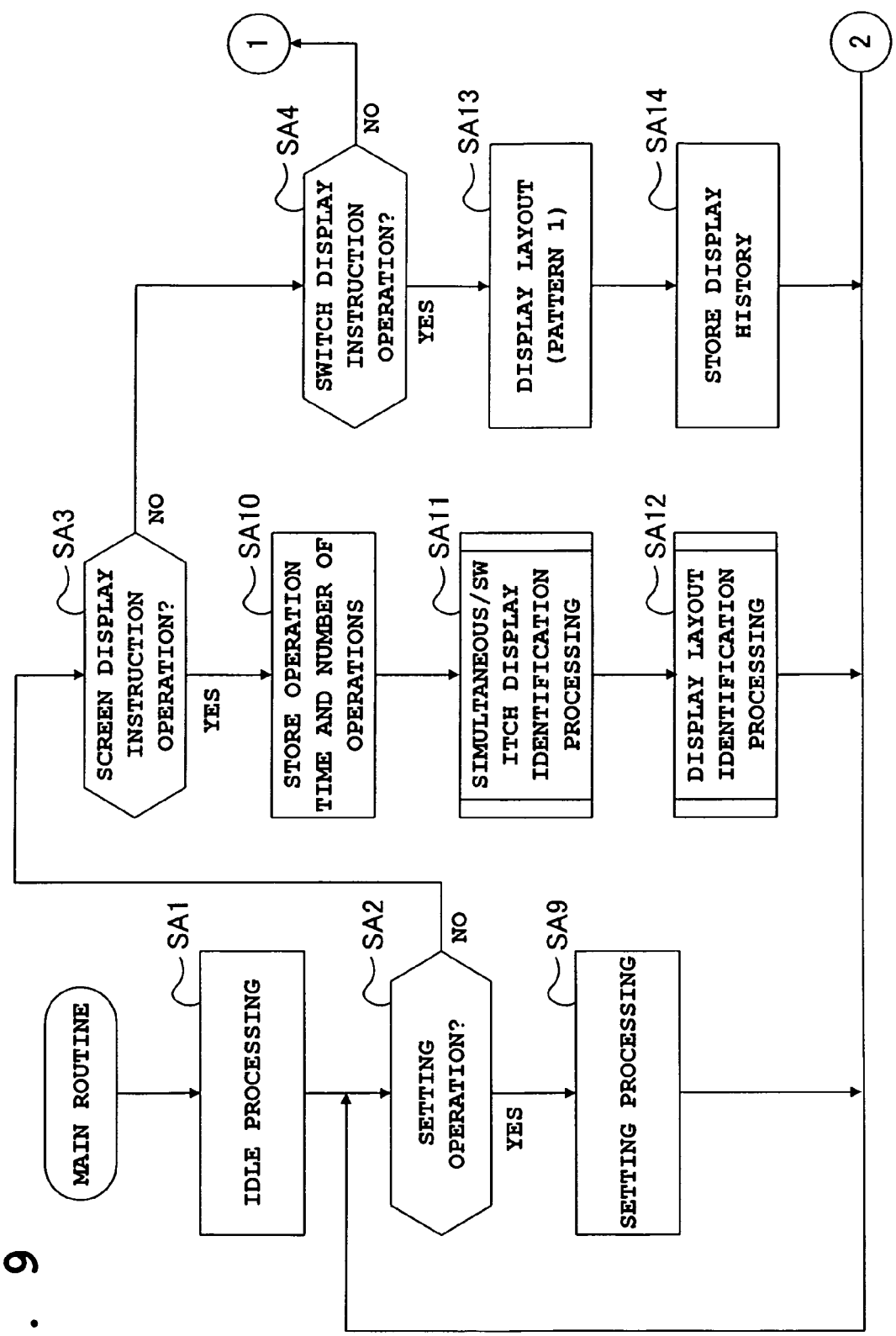
FIG. 9 is a flowchart showing an operation of a main routine.
Figure 10:
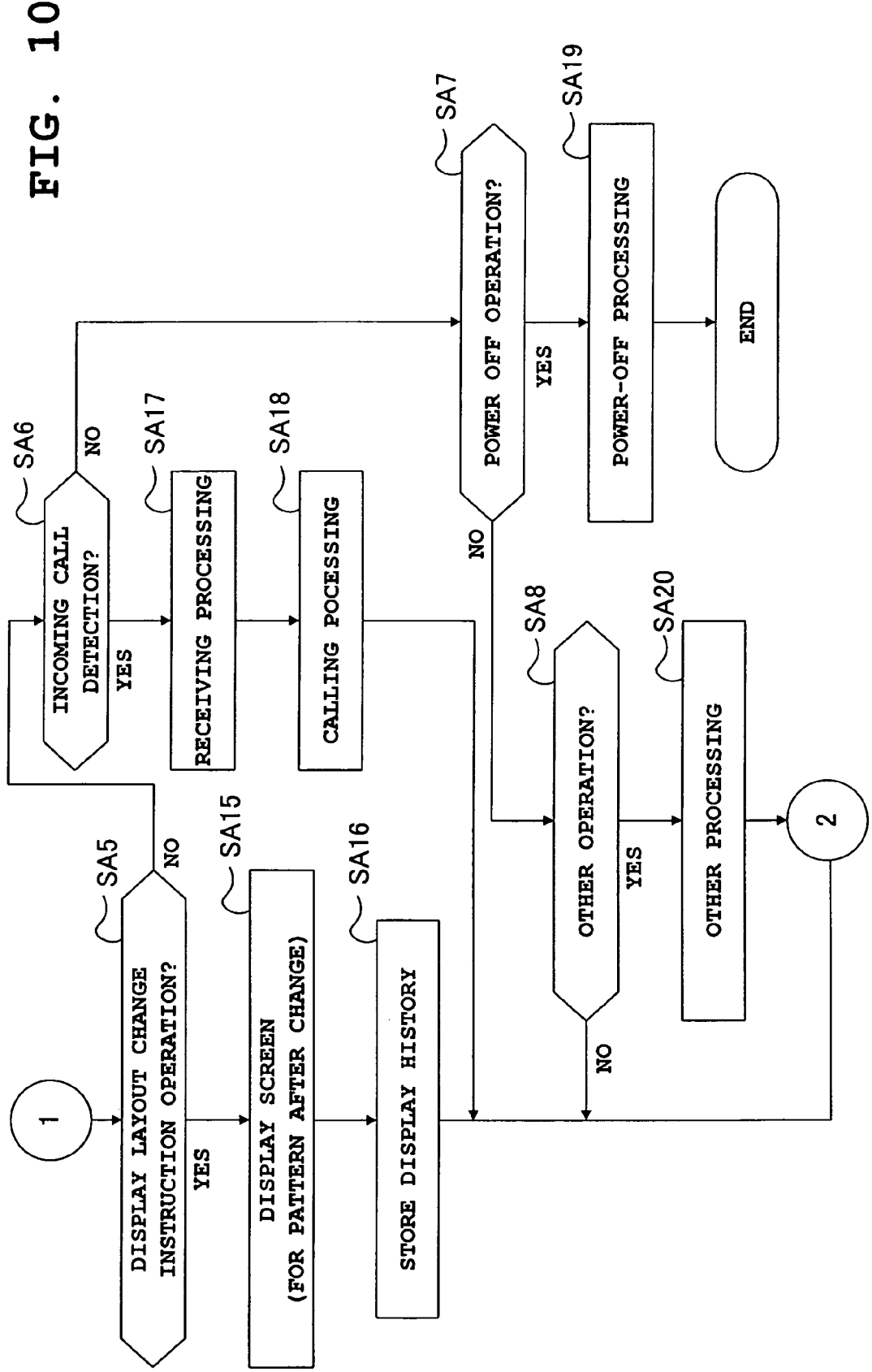
FIG. 10 is a flowchart showing the operation of the main routine.

FIG. 9 and FIG. 10 are flowcharts showing the operation of the main routine that is executed by the CPU 100. When the power of the mobile terminal 10 is turned ON by the power ON operation by the user, the CPU 100 advances the processing to Step SA1 shown in FIG. 9, where it executes idle processing of entering an idle state after executing a position registration control sequence so as to register the positions on the network side.

Subsequently, at Step SA2 to Step SA4, and Step SA5 to SA8 shown in FIG. 10, the CPU 100 judges whether an event on "setting operation", "screen display instruction operation", "switch display instruction operation", "display layout change instruction operation", "incoming call detection", "power OFF operation" and "other operation" is generated. If none of these events are generated, the judgment result at each of the Steps SA2 to SA8 as described above is "NO", and the CPU 100 stands by in the idle state. On the other hand, if one of the events as described above is generated in the idle state, the CPU 100 executes the processing corresponding to the event that has been generated. The operation for each event will be hereafter described.

a. When Setting Operation is Performed

In this case, the judgment result at Step SA2 is "YES", and the CPU 100 advances to Step SA9, where it executes the setting processing. In the setting processing, in accordance with the setting operation by the user, the CPU 100 not only registers new screen information (see FIG. 3) in the screen information memory section 102a of the RAM 102 and edits the contents of the registered screen information, but also deletes the screen information that is specified. In addition, in the setting processing, the CPU 100 performs registration of new data, editing of contents and deletion also for the display control table information (see FIG. 5) that is stored in the simultaneous/switch display condition memory section 102c of the RAM 102 and for the display layout table information (see FIG. 6) that is stored in the display layout condition memory section 102d in the similar manner as the above. After such setting processing at Step SA9 is completed, the CPU 100 returns the processing to Step SA2 as described above and returns to the idle state.

b. When Screen Display Instruction Operation is Performed

In this case, the judgment result at Step SA3 is "YES", and the CPU 100 advances to Step SA10, where it detects the operation time and the number of operations of the screen display instruction operation and temporarily stores them. Note that the operation time herein refers to the length of time during which the operation button subject to the screen display instruction operation is held down. In addition, the number of operations refers to the number of times the operation button is held down. Subsequently, the CPU 100 executes the simultaneous/switch display identification processing at Step SA11.

In the simultaneous/switch display identification processing, as will be described later, the CPU 100 reads out the simultaneous/switch display condition that is currently employed out from the display control table information stored in the simultaneous/switch display condition memory section 102c of the RAM 102, and identifies whether the screen display instruction operation instructs the switch display or the simultaneous display in accordance with the simultaneous/switch display condition that has been read out and the circumstance when the screen display instruction operation is performed.

Subsequently, at Step SA12, the CPU 100 executes the display layout identification processing. In the display layout identification processing, as will be described later, when the simultaneous/switch display identification processing Step SA11 as described above identifies that the screen display instruction operation by the user instructs the simultaneous display, the CPU 100 reads out the display layout condition that is currently employed from the display layout table information stored in the display layout condition memory section 102d of the RAM 102, and controls the display layout for the simultaneous display in accordance with the display layout condition that has been read out and the circumstance when the screen display instruction operation is performed. Then, when the display layout identification processing is completed, the CPU 100 returns the processing to Step SA2 as described above and returns to the idle state.

c. When Switch Display Instruction Operation is Performed

In this case, the judgment result at Step SA4 is "YES", and the CPU 100 advances to Step SA13. At Step SA13, in accordance with the display layout for the pattern 1 shown in FIG. 8A, the CPU 100 displays the screen for which the user has instructed the switch display on the display screen DSP of the display section 106. Subsequently, at Step SA14, the CPU 100 stores the display history information in the display history memory section 102b of the RAM 102 (see FIG. 4). The display history information consists of "date and time" when the switch display instruction operation is performed, the type of "screen on display" which has been displayed in the display area A2 of the display screen DSP before the CPU 100 executes the switch display instruction operation, the type of "display instruction screen" for which display instruction is made, "display control (switch display)" and "display layout (the pattern 1)". Subsequently, the CPU 100 returns the processing to Step SA2 as described above and returns to the idle state.

d. When Display Layout Change Instruction Operation is Performed

In this case, the judgment result at Step SA5 shown in FIG. 10 is "YES", and the CPU 100 advances to Step SA15. At Step SA15, in accordance with the display layout of the pattern selected from the display layouts of the patterns 1 to 4 respectively shown in FIG. 8A to FIG. 8B for which change instruction has been made, the CPU 100 performs screen display on the display screen DSP of the display section 106.

Subsequently, at Step SA16, the CPU 100 stores the display history information in the display history memory section 102b of the RAM 102. The display history information consists of "date and time" when the display layout change instruction operation is performed, the type of "screen on display", the type of "display instruction screen", "display control (distinction of the switch display or the simultaneous display)" and "display layout (the pattern for which change instruction has been made)". Then, the CPU 100 returns the processing to Step SA2 as described above and returns to the idle state.

e. When Incoming Call is Detected

When the CPU 100 detects an incoming call, the judgment result at Step SA6 is "YES", and the CPU 100 advances to Step SA17, where it executes receiving processing. In the receiving processing, the CPU 100 reports reception. When the off-hook operation is performed during this reception report, the CPU 100 advances to Step SA18, where the CPU 100 executes the calling processing of connecting the line with the calling party so as to initiate a call. Then, after disconnecting the line responding to the on-hook operation, the CPU 100 returns the processing to Step SA2 as described above and returns to the idle state.

f. When Power-Off Operation is Performed

In this case, the judgment result at Step SA7 is "YES", and the CPU 100 advances to Step SA19, where it executes the power-OFF processing and subsequently completes this processing.

g. When Other Operation is Performed

When operations other than the operations as described above are performed, the judgment result at Step SA8 is "YES", and the CPU 100 advances to Step SA20, where it executes the other processing. The other processing refers to processing such as e-mail creation and e-mail transmission. After the CPU 100 executes the other processing, it returns the processing to SA2 as described above and returns to the idle state.

B-2. Operation of Simultaneous/Switch Display Identification Processing

Figure 11:
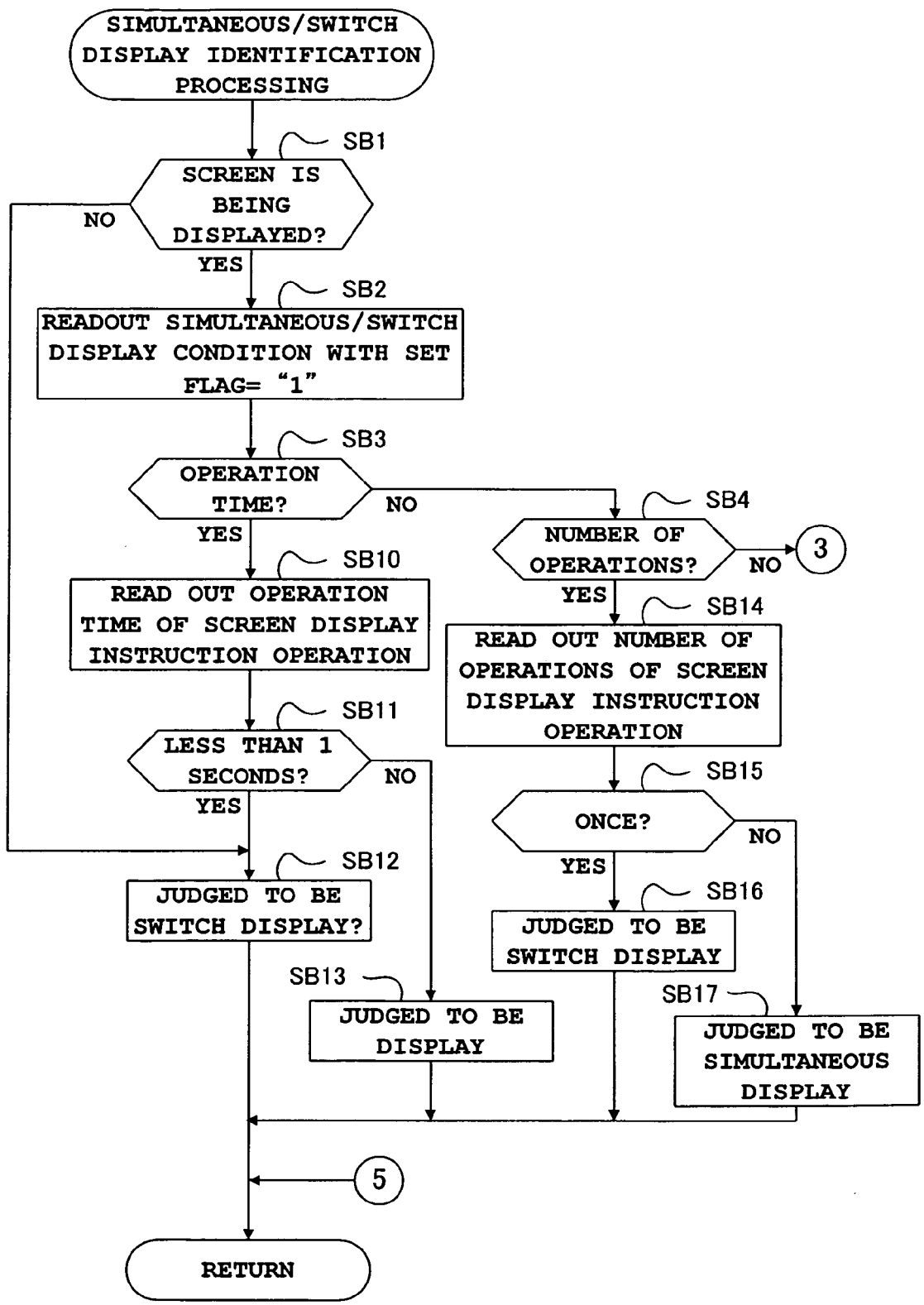
FIG. 11 is a flowchart showing an operation of simultaneous/switch display identification processing.
Figure 12:
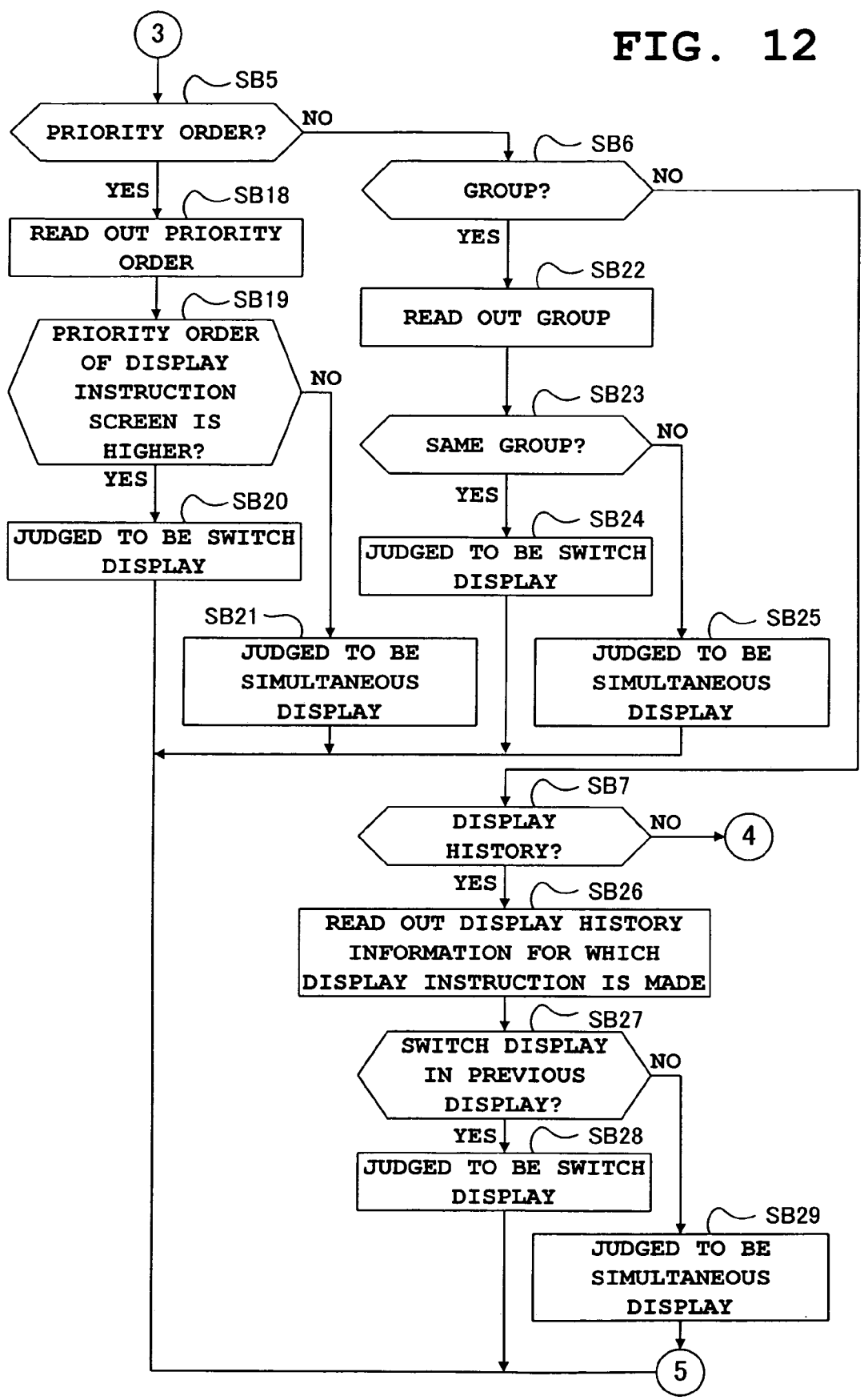
FIG. 12 is a flowchart showing the operation of the simultaneous/switch display identification processing.
Figure 13:
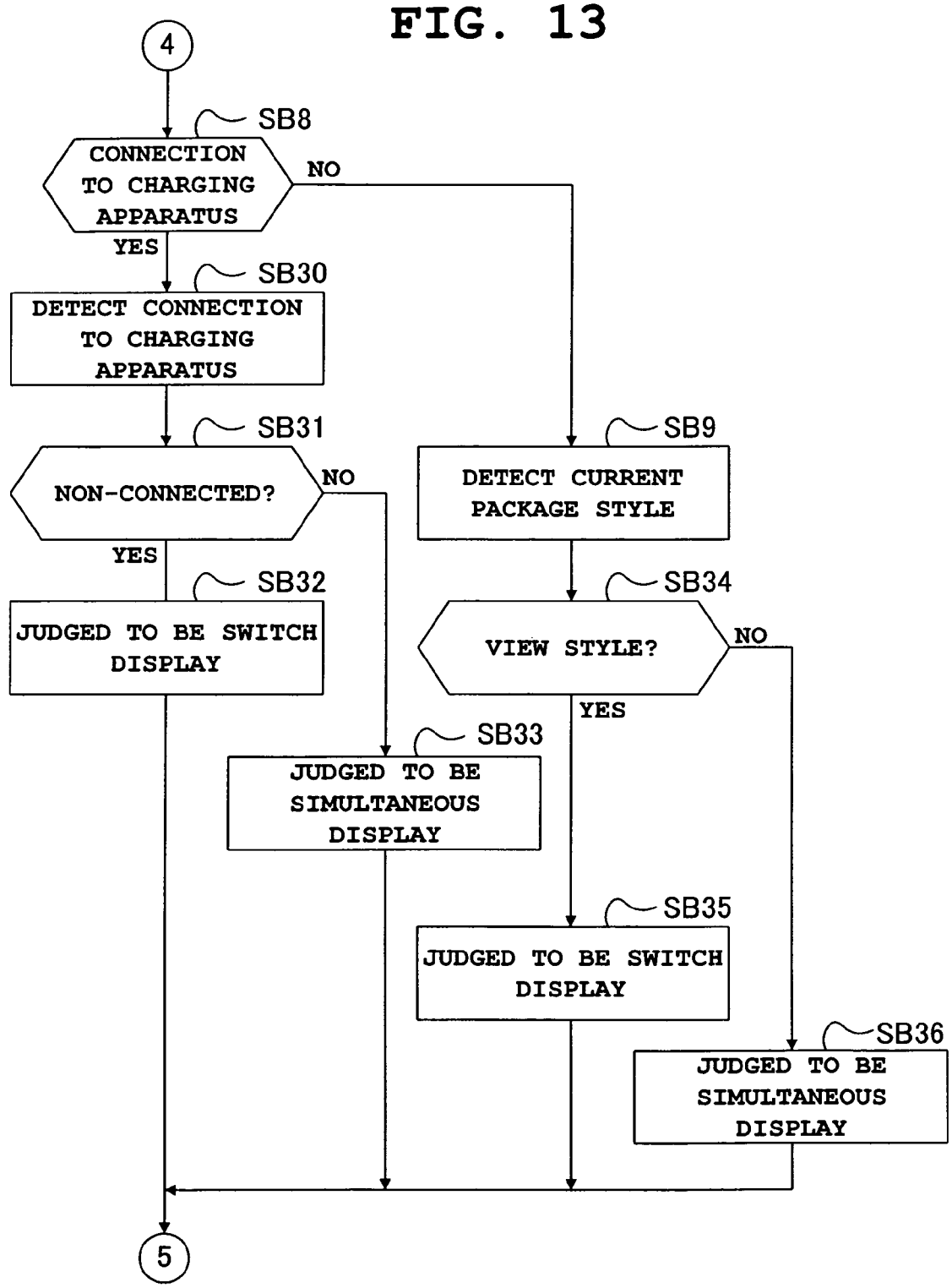
FIG. 13 is a flowchart showing the operation of the simultaneous/switch display identification processing.

FIG. 11 to FIG. 13 are flowcharts showing the operation of the simultaneous/switch display identification processing that is executed by the CPU 100.

When the present processing is executed via Step SA11 in the main routine as described above (see FIG. 9), the CPU 100 advances the processing to Step SB1 shown in FIG. 11, where it judges whether or not the screen display instruction operation by the user is performed while the screen is being displayed. If not while the screen is being displayed, the judgment result is "NO" and the CPU 100 advances to Step SB12, where the CPU 100 judges that the screen display instruction operation by the user instructs the switch display and ends the present processing.

On the other hand, when the screen display instruction operation by the user is performed while the screen is being displayed, the judgment result at Step SB1 as described above is "YES", and the CPU 100 advances to Step SB2. At Step SB2, the CPU 100 reads out the simultaneous/switch display condition for which the set flag is set at "1", that is, the simultaneous/switch display condition that is currently employed from the display control table information stored in the simultaneous/switch display condition memory section 102c of the RAM 102.

Next, at Steps SB3 to SB4, Steps SB5 to SB7 shown in FIG. 12, and Step SB8 shown in FIG. 13, the CPU 100 judges which of "operation time", "number of operations", "priority order", "group", "display history", "connection to charging apparatus" and "package style", the simultaneous/switch display condition that has been read out is. Hereinafter, the operation in accordance with various conditions as described above will be described.

a. When Simultaneous/Switch Display Condition is "Operation Time"

In this case, the judgment result at Step SB3 is YES, and the CPU 100 advances to Step SB10, where it reads out the operation time of the screen display instruction operation that has been stored in Step SA10 as described before (see FIG. 9). Subsequently, at Step SB11, the CPU 100 judges whether or not the operation time that has been read out is less than 1 second.

When the operation time is less than 1 second, the judgment result is "YES" and the CPU 100 advances to Step SB12. At Step SB12, the CPU 100 reads out the display control data assigned for the case where "operation time" is less than 1 second from the display control table information that is stored in the simultaneous/switch display condition memory section 102c (see FIG. 5) of the RAM 102. Based on this, the CPU 100 judges that the screen display instruction operation by the user instructs the switch display and ends the present processing.

On the contrary, when the operation time that the CPU 100 has read out is not less than 1 second, the judgment result at Step SB11 as described above is "NO", and the CPU 100 advances to Step SB13. Then, at Step SB13, the CPU 100 reads out the display control data assigned for the case where "operation time" is 1 second or more from the display control table information that is stored in the simultaneous/switch display condition memory section 102c of the RAM 102. Based on this, the CPU 100 judges that the screen display instruction operation by the user instructs the simultaneous display and ends the present processing.

b. When Simultaneous/Switch Display Condition is "Number of Operations"

In this case, the judgment result at Step SB4 is YES, and the CPU 100 advances to Step SB14, where it reads out the number of operations of the screen display instruction operation that has been stored in Step SA10 as described before (see FIG. 9). Subsequently, at Step SB15, the CPU 100 judges whether or not the number of operations that has been read out is 1.

When the number of operations is 1, the judgment result is "YES", and the CPU 100 advances to Step SB16. At Step SB16, the CPU 100 reads out the display control data assigned for the case where "number of operations" is 1 from the display control table information that is stored in the simultaneous/switch display condition memory section 102c of the RAM 102. Based on this, the CPU 100 judges that the screen display instruction operation by the user instructs the switch display and ends the present processing.

On the other hand, when the number of operations that the CPU 100 has read out is not 1, the judgment result at Step SB15 as described above is "NO", and the CPU 100 advances to Step SB17. Then, at Step SB17, the CPU 100 reads out the display control data assigned for the case where "number of operations" is 2 or more from the display control table information that is stored in the simultaneous/switch display condition memory section 102c of the RAM 102. Based on this, the CPU 100 judges that the screen display instruction operation by the user instructs the simultaneous display and ends the present processing.

c. When Simultaneous/Switch Display Condition is "Priority Order"

In this case, the judgment result at Step SB5 shown in FIG. 12 is "YES", and the CPU 100 advances to Step SB18. At Step SB18, the CPU 100 reads out the priority order of the screen on display and the priority order of the display instruction screen. Specifically, the CPU 100 reads out the priority order aligned with the screen ID of the screen on display and the priority order aligned with the screen ID of the display instruction screen from the screen information that is stored in the screen information memory section 102a of the RAM 102 (see FIG. 3).

Subsequently, at Step SB19, the CPU 100 judges whether or not the priority order of the display instruction screen is higher than the priority data of the screen on display. When the priority order of the display instruction screen is higher, the judgment result is "YES" and the CPU 100 advances to Step SB20. At Step SB20, the CPU 100 reads out the display control data assigned for the case where the priority order of the display instruction screen is higher from the display control table information that is stored in the simultaneous/switch display condition memory section 102c of the RAM 102. Based on this, the CPU 100 judges that the screen display instruction operation by the user instructs the switch display and ends the present processing.

On the other hand, when the priority order of the display instruction screen is lower, the judgment result at Step SB19 as described above is "NO", and the CPU 100 advances to Step SB21. Then, at Step SB21, the CPU 100 reads out the display control data assigned for the case where the priority order of the display instruction screen is lower from the display control table information that is stored in the simultaneous/switch display condition memory section 102c of the RAM 102. Based on this, CPU 100 judges that the screen display instruction operation by the user instructs the simultaneous display and ends the present processing.

d. When Simultaneous/Switch Display Condition is "Group"

In this case, the judgment result at Step SB6 is "YES", and the CPU 100 advances to Step SB22. At Step SB22, the CPU 100 reads out the group aligned with the screen ID of the screen on display and the group aligned with the screen ID of the display instruction screen from the screen information that is stored in the screen information memory section 102a of the RAM 102.

Subsequently, at Step SB23, the CPU 100 judges whether or not the group for the screen on display and the group for the display instruction screen that have been read out at Step SB22 as described above are the same. When both screens belong to the same group, the judgment result is "YES", and the CPU 100 advances to Step SB24. At Step SB24, the CPU 100 reads out the display control data assigned for the case where the groups of both screens are the same from the display control table information that is stored in the simultaneous/switch display condition memory section 102c of the RAM 102. Based on this, the CPU 100 judges that the screen display instruction operation by the user instructs the switch display and ends the present processing.

On the other hand, when the groups of the two screens are different, the judgment result at Step SB23 as described above is "NO", and the CPU 100 advances to Step SB25. Then, at Step SB25, the CPU 100 reads out the display control data assigned for the case where the groups are different from the display control table information that is stored in the simultaneous/switch display condition memory section 102c of the RAM 102. Based on this, the CPU 100 judges that the screen display instruction operation by the user instructs the simultaneous display and ends the present processing.

e. When Simultaneous/Switch Display Condition is "Display History"

In this case, the judgment result at Step SB7 is "YES", and the CPU 100 advances to Step SB26. At Step SB26, the CPU 100 reads out the display history information in the previous display of the screen for which the display instruction is made by the screen display instruction operation (display instruction screen) from the display history memory section 102b of the RAM 102 (see FIG. 4). Subsequently, at Step SB27, the CPU 100 judges whether or not "display control" contained in the display history information in the previous display is the switch display. When "display control" is the switch display, the judgment result is "YES", and the CPU 100 advances to Step SB28, where the CPU 100 judges that the screen display instruction operation by the user instructs the switch display and ends the present processing.

On the other hand, when "display control" contained in the display history information in the previous display is the simultaneous display, the judgment result at Step SB27 as described above is "NO", and the CPU 100 advances to Step SB29, where the CPU 100 judges that the screen display instruction operation by the user instructs the simultaneous display and ends the present processing.

f. When Simultaneous/Switch Display Condition is "Connection to Charging Apparatus"

In this case, the judgment result at Step SB8 shown in FIG. 13 is "YES", and the CPU 100 advances to Step SB30. At Step SB30, the CPU 100 detects whether or not the charging apparatus connecting section 110 generates a charging apparatus connection detection signal, in other words, whether or not the charging apparatus 20 (see FIG. 1) is connected to the charging apparatus connecting section 110. Subsequently, at Step SB31, based on the result of the charging apparatus connection detection at Step SB30 as described above, the CPU 100 judges whether or not the mobile terminal 10 is in the non-connected state with respect to the charging terminal of the charging apparatus 20. When in the non-connected state, the judgment result is "YES", and the CPU 100 advances to Step SB32, where the CPU 100 reads out the display control data that is assigned for "non-connected" from the display control table information stored in the simultaneous/switch display condition memory section 102c of the RAM 102. Based on this, the CPU 100 judges that the screen display instruction operation by the user instructs the switch display and ends the present processing.

On the other hand, when in the connected state, the judgment result at Step SB31 as described above is "NO", and the CPU 100 advances to Step SB33. Then, at Step SB33, the CPU 100 reads out the display control data assigned for "connected" from the display control table information that is stored in the simultaneous/switch display condition memory section 102c of the RAM 102. Based on this, the CPU 100 judges that the screen display instruction operation by the user instructs the simultaneous display and ends the present processing.

g. When Simultaneous/Switch Display Condition is "Package Style"

In this case, all judgment results at Steps SB3 to SB4 (see FIG. 11), Steps SB5 to SB7 (see FIG. 12) and Step SB8 (see FIG. 13) as described above are "NO", and the CPU 100 advances to Step SB9 shown in FIG. 13. At Step SB9, the CPU 100 detects the current package style ("the open style" or "the view style") based on a signal detected by the package style detection section 109.

Subsequently, at Step SB34, the CPU 100 judges whether or not the package style that has been detected is "view style". When it is "view style", the judgment result is "YES", and the CPU 100 advances to Step SB35, where the CPU 100 reads out the display control data assigned for "view style" from the display control table information that is stored in the simultaneous/switch display condition memory section 102c of the RAM 102. Based on this, the CPU 100 judges that the screen display instruction operation by the user instructs the switch display and ends the present processing.

On the other hand, when the package style that the CPU 100 has detected is "open style", the judgment result at Step SB34 as described above is "NO", and the CPU 100 advances to Step SB36, where the CPU 100 reads out the display control data assigned for "open style" from the display control table information that is stored in the simultaneous/switch display condition memory section 102c of the RAM 102. Based on this, the CPU 100 judges that the screen display instruction operation by the user instructs the simultaneous display and ends the present processing.

As described above, in the simultaneous/switch display identification processing, when the user performs the screen display instruction operation in the state where the screen is displayed, the CPU 100 reads out the simultaneous/switch display condition that is currently employed from the display control table information stored in the simultaneous/switch display condition memory section 102c of the RAM 102, and specifies whether the screen display instruction operation instructs the switch display or the simultaneous display in accordance with the simultaneous/switch display condition that the CPU 100 has read out and the circumstance when the screen display instruction operation is performed.

B-3. Display Operation of Display Layout Identification Processing

Figure 14:
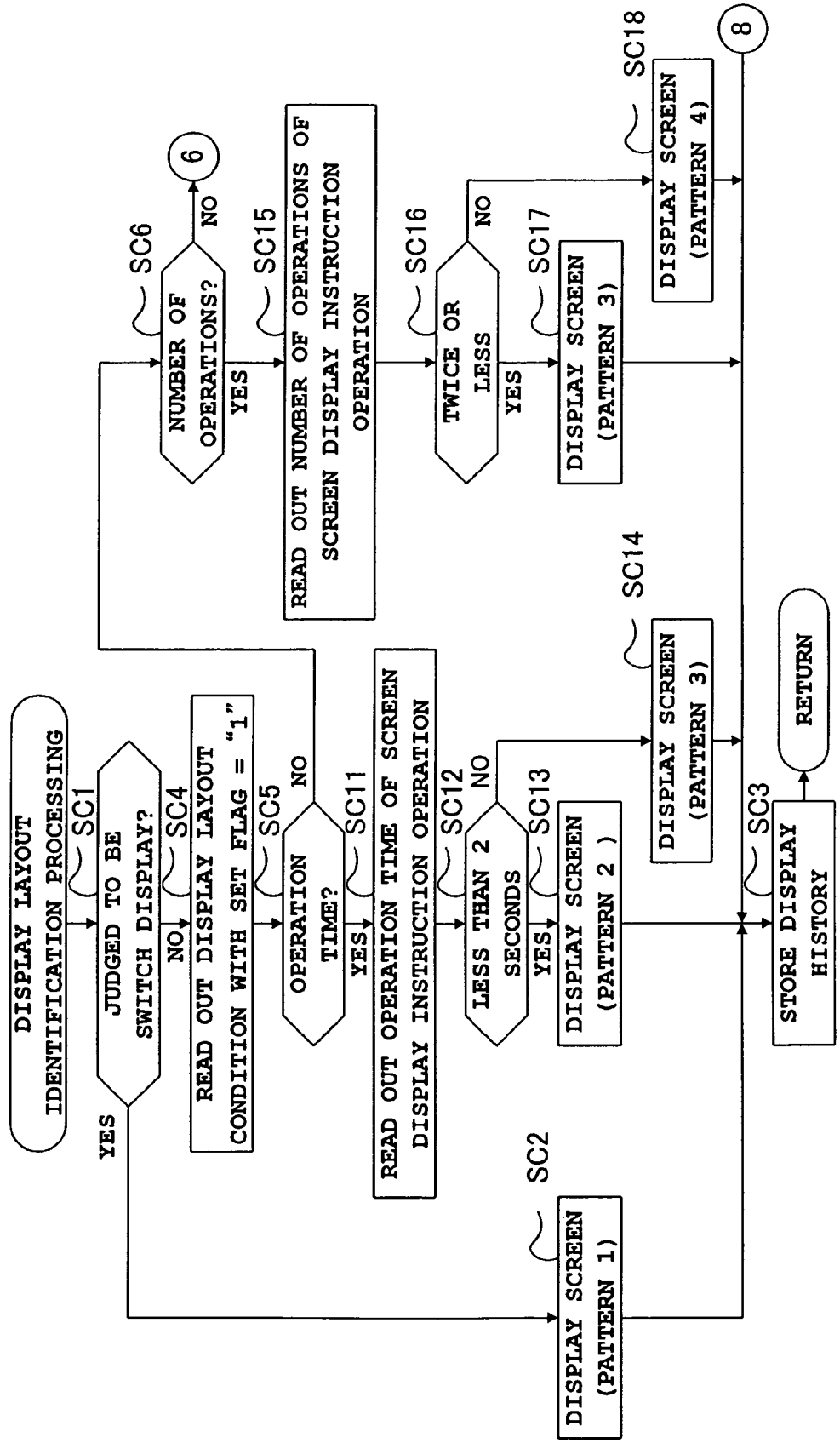
FIG. 14 is a flowchart showing the operation of the display layout identification processing.
Figure 15:
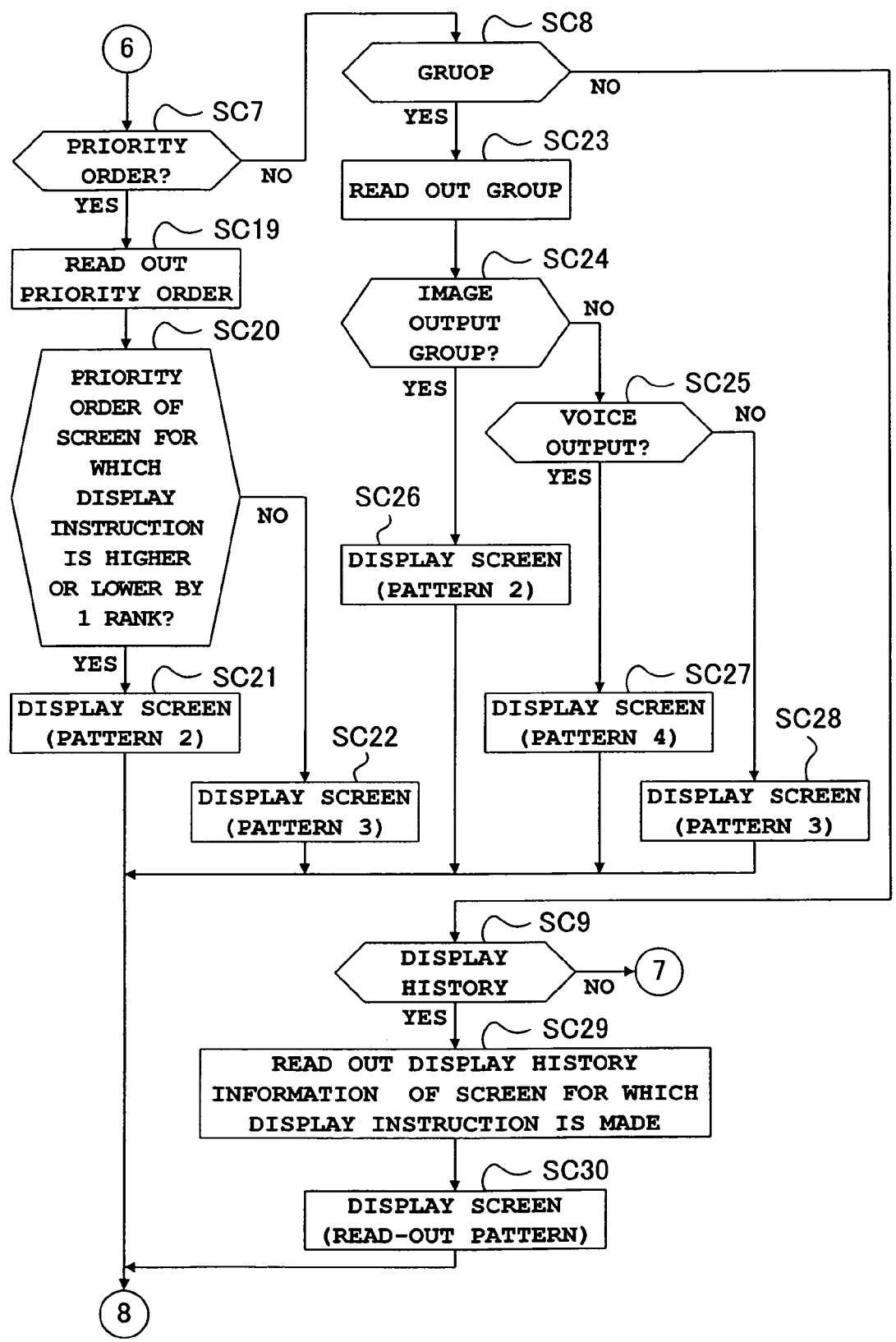
FIG. 15 is a flowchart showing the operation of the display layout identification processing.
Figure 16:
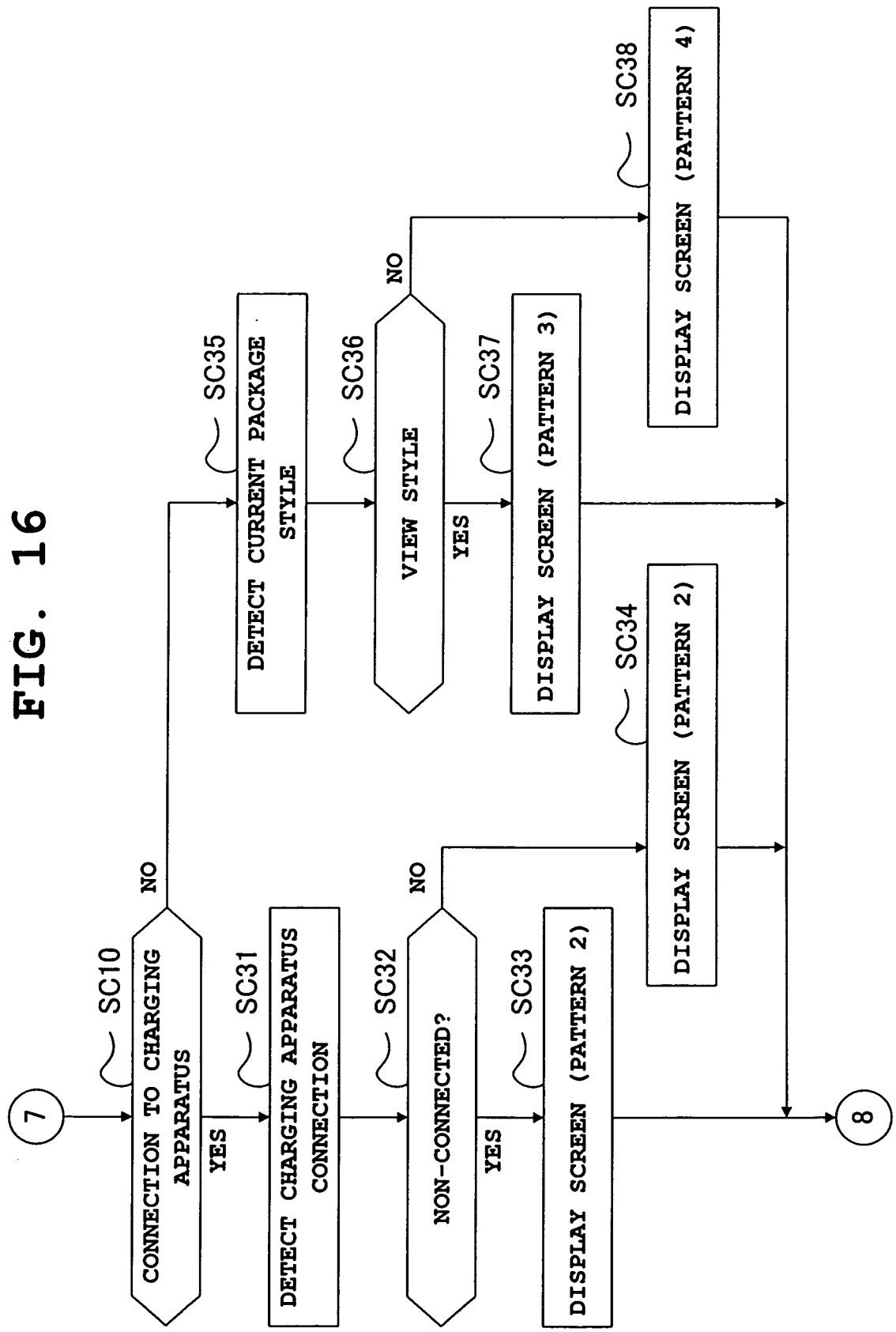
FIG. 16 is a flowchart showing the operation of the display layout identification processing.

The operation of the display layout identification processing will now be described with reference to FIG. 14 to FIG. 16. FIG. 14 to FIG. 16 are flowcharts showing the operation of the display layout identification processing that is executed by the CPU 100. When the present processing is executed via Step SA12 of the main routine as described before (see FIG. 9), the CPU 100 advances the processing to Step SC1 shown in FIG. 14.

At Step SC1, the CPU 100 judges whether or not the simultaneous/switch display identification processing as described above has judged that the screen display instruction operation by the user instructs the switch display. When it is judged that the screen display instruction operation by the user instructs the switch display, the judgment result is "YES", and the CPU 100 advances to Step SC2, where it switches screens so as to display the screen for which the display instruction is made in accordance with the display layout for the pattern 1 shown in FIG. 8A. Subsequently, the CPU 100 advances to Step SC3, where it registers the display history information ("date and time", "screen on display", "display instruction screen", "display control" and "display layout" ) related to the switch display in the display history memory section 102b of the RAM 102, and ends the present processing.

On the other hand, when it is judged that the screen display instruction operation by the user instructs the simultaneous display, the judgment result at Step SC1 as described above is "NO", and the CPU 100 advances to Step SC4. At Step SC4, the CPU 100 reads out the display layout condition for which the set flag is set at "1", that is, the display layout condition that is currently employed, from the display layout table information that is stored in the display layout condition memory section 102*d* (see FIG. 6) of the RAM 102.

Next, at Steps SC5 to SC6 and Step SC7 to SC9 shown in FIG. 15 and Step SC10 shown in FIG. 16, the CPU 100 judges which of "operation time", "number of operations", "priority order", "group", "display history", "connection to charging apparatus" and "package style", the display layout condition that has been read out is. Hereinafter, the operation in accordance with each of the display layout conditions as described above will be described.

a. When Display Layout Condition is "Operation Time"

In this case, the judgment result at Step SC5 is "YES", and the CPU 100 advances to Step SC11, where the CPU 100 reads out the operation time of the screen display instruction operation that is stored at Step SA10 as described before (see FIG. 9). Subsequently, at Step SC12, the CPU 100 judges whether or not the operation time that has been read out is less than 2 seconds. When the operation time is less than 2 seconds, the judgment result is "YES", and the CPU 100 advances to Step SC13.

At Step SC13, the CPU 100 reads out the display layout control data assigned for the case where "operation time" is less than 2 seconds from the display layout table information that is stored in the display layout condition memory section 102*d* of the RAM 102. Based on this, the CPU 100 displays the screen on display and the display instruction screen simultaneously in accordance with the display layout of the pattern 2 shown in FIG. 8B. Subsequently, the CPU 100 advances to Step SC3, where it registers the display history information related to the simultaneous display in the display history memory section 102*b* of the RAM 102 and ends the present processing.

On the other hand, when the operation time the CPU 100 has read out is not less than 2 seconds, the judgment result at Step SC12 as described above is "NO", and the CPU 100 advances to Step SC14. At Step SC14, the CPU 100 reads out the display layout control data assigned for the case where "operation time" is 2 seconds or more from the display layout table information that is stored in the display layout condition memory section 102*d* of the RAM 102. Based on this, the CPU 100 displays the screen on display and the display instruction screen simultaneously in accordance with the display layout for the pattern 3 shown in FIG. 8C. Subsequently, the CPU 100 advances to Step SC3, where the CPU 100 registers the display history information related to the simultaneous display in the display history memory section 102*b* of the RAM 102 and ends the present processing.

b. When Display Layout Condition is "Number of Operations"

In this case, the judgment result at Step SC6 is "YES", and the CPU 100 advances to Step SC15, where the CPU 100 reads out the number of operations of the screen display instruction operation that is stored at Step SA10 as described before (see FIG. 9). Subsequently, at Step SC16, the CPU 100 judges whether or not the number of operations that has been read out is 2 or less. When the number of operations is 2 or less, the judgment result is "YES", and the CPU 100 advances to Step SC17.

At Step SC17, the CPU 100 reads out the display layout control data assigned for the case where "number of operations" is 2 or less from the display layout table information that is stored in the display layout condition memory section 102*d* of the RAM 102. Based on this, the CPU 100 displays the screen on display and the display instruction screen simultaneously in accordance with the display layout for the pattern 3 shown in FIG. 8C. Subsequently, the CPU 100 advances to Step SC3, where it registers the display history information related to the simultaneous display in the display history memory section 102*b* of the RAM 102 and ends the present processing.

On the other hand, when the number of operations that has been read out is not 2 or less, the judgment result at SC16 as described above is "NO", and the CPU 100 advances to Step SC18. At Step SC18, the CPU 100 reads out the display layout control data assigned for the case where "number of operations" is 3 or more from the display layout table information that is stored in the display layout condition memory section 102*d* of the RAM 102. Based on this, the CPU 100 displays the screen on display and the display instruction screen simultaneously in accordance with the display layout for the pattern 4 shown in FIG. 8D. Subsequently, the CPU 100 advances to Step SC3, where it registers the display history information related to the simultaneous display in the display history memory section 102*b* of the RAM 102 and ends the present processing.

c. When Display Layout Condition is "Priority Order"

In this case, the judgment result at Step SC7 shown in FIG. 15 is "YES", and the CPU 100 advances to Step SC19, where the CPU 100 reads out the priority order aligned with the screen ID of the screen on display and the priority order aligned with the screen ID of the display instruction screen from the screen information that is stored in the screen information memory section 102*a* of the RAM 102 (see FIG. 3). Subsequently, at Step SC20, the CPU 100 judges whether or not the priority order of the display instruction screen is higher than the priority order of the screen on display or the priority order of the display instruction screen is lower by 1 rank. When the priority order of the display instruction screen is higher/lower by 1 rank, the judgment result is "YES", and the CPU 100 advances to Step SC21.

At Step SC21, the CPU 100 reads out the display layout control data assigned for the case where "priority order of screen for which display instruction is higher or lower by 1 rank" from the display layout table information that is stored in the display layout condition memory section 102*d* of the RAM 102. Based on this, the CPU 100 displays the screen on display and the display instruction screen simultaneously in accordance with the display layout for the pattern 2 shown in FIG. 8B. Subsequently, the CPU 100 advances to Step SC3 shown in FIG. 14, where it registers the display history information related to the simultaneous display in the display history memory section 102*b* of the RAM 102 and ends the present processing.

On the other hand, when the priority order of the display instruction screen is lower by 2 ranks or more, the judgment result at Step SC20 as described above is "NO", and the CPU 100 advances to Step SC22. At Step SC22, the CPU 100 reads out the display layout control data assigned for the case where "priority order of screen for which display instruction is lower by 2 ranks or more" from the display layout table information that is stored in the display layout condition memory section 102*d* of the RAM 102. Based on this, the CPU 100 displays the screen on display and the display instruction screen simultaneously in accordance with the display layout for the pattern 3 shown in FIG. 8C. Subsequently, the CPU 100 advances to Step SC3 shown in FIG. 14, where it registers the display history information related to the simultaneous display in the display history memory section 102*b* of the RAM 102 and ends the present processing.

d. When Display Layout Condition is "Group"

In this case, the judgment result at Step SC8 is "YES", and the CPU 100 advances to Step SC23. At Step SC23, the CPU 100 reads out the group aligned with the screen ID of the display instruction screen from the screen information that is stored in the screen information memory section 102*a* of the RAM 102 (see FIG. 3). Subsequently, at Steps SC24 to SC25, the CPU 100 judges which group out of an image output, a voice output and other than the image output/voice output, the group that has been read out belongs to.

When the display instruction screen belongs to the image output group, the judgment result at Step SC24 is "YES", and the CPU 100 advances to Step SC26, where the CPU 100 reads out the display layout control data assigned for the case where "screen for which display instruction is made belongs to image output group" from the display layout table information that is stored in the display layout condition memory section 102*d* of the RAM 102. Based on this, the CPU 100 displays the screen on display and the display instruction screen simultaneously in accordance with the display layout of the pattern 2 shown in FIG. 8B. Subsequently, the CPU 100 advances to Step SC3 shown in FIG. 14, where it registers the display history information related to the simultaneous display in the display history memory section 102*b* of the RAM 102 and ends the present processing.

When the display instruction screen belongs to the voice output group, the judgment result at Step SC25 is "YES", and the CPU 100 advances to Step SC27, where the CPU 100 reads out the display layout control data assigned for the case where "screen for which display instruction is made belongs to voice output group" from the display layout table information stored in the display layout condition memory section 102*d* of the RAM 102. Based on this, the CPU 100 displays the screen on display and the display instruction screen simultaneously in accordance with the display layout of the pattern 4 shown in FIG. 8D. Subsequently, the CPU 100 advances to Step SC3 shown in FIG. 14, where it registers the display history information related to the simultaneous display in the display history memory section 102*b* of the RAM 102 and ends the present processing.

When the display instruction screen belongs to a group other than the image output/voice output, the judgment results at Steps SC24, SC25 as described above are "NO" respectively, and the CPU 100 advances to Step SC28, where the CPU 100 reads out the display layout control data assigned for the case where "screen for which display instruction is made belongs to other group" from the display layout table information stored in the display layout condition memory section 102*d* of the RAM 102. Based on this, the CPU 100 displays the screen on display and the display instruction screen simultaneously in accordance with the display layout for the pattern 3 shown in FIG. 8C. Subsequently, the CPU 100 advances to Step SC3 shown in FIG. 14, where it registers the display history information related to the simultaneous display in the display history memory section 102*b* of the RAM 102 and ends the present processing.

e. When Display Layout Condition is "Display History"

In this case, the judgment result at Step SC9 is "YES", and the CPU 100 advances to Step SC29. At Step SC29, the CPU 100 reads out the display history information in the previous display of the screen for which the display instruction is made by the screen display instruction operation (display instruction screen) from the display history memory section 102*b* of the RAM 102 (see FIG. 4). Subsequently, at Step SC30, the CPU 100 displays the screen on display and the display instruction screen simultaneously in accordance with the pattern which is specified in "the display layout" of the display history information in the previous display. Subsequently, the CPU 100 advances to Step SC3 shown in FIG. 14, where it registers the display history information related to the simultaneous display in the display history memory section 102*b* of the RAM 102 and ends the present processing.

f. When Display Layout Condition is "Connection to Charging Apparatus"

In this case, the judgment result at Step SC10 shown in FIG. 16 is "YES", and the CPU 100 advances to Step SC31. At Step SC31, the CPU 100 detects whether or not the charging apparatus connecting section 110 has generated a charging apparatus connection detection signal, in other words, whether or not the charging apparatus 20 (see FIG. 1) is connected to the charging apparatus connecting section 110. Subsequently, at Step SC32, the CPU 100 judges whether or not the mobile terminal 10 is in the non-connected state with respect to the charging terminal of the charging apparatus 20 (see FIG. 1), based on the result of the charging apparatus connection detection at Step SC31 as described above.

When in the non-connected state, the judgment result is "YES", and the CPU 100 advances to Step SC33, the CPU 100 reads out the display layout control data assigned for "non-connected" from the display layout table information that is stored in the display layout condition memory section 102*d* of the RAM 102. Based on this, the CPU 100 displays the screen on display and the display instruction screen simultaneously in accordance with the display layout of the pattern 2 shown in FIG. 8B. Subsequently, the CPU 100 advances to Step SC3 shown in FIG. 14, where it registers the display history information related to the simultaneous display in the display history memory section 102*b* of the RAM 102 and ends the present processing.

On the other hand, when in the connected state, the judgment result at Step SC32 as described above is "NO", and the CPU 100 advances to Step SC34. Next, at Step SC34, the CPU 100 reads out the display layout control data assigned for "connected" from the display layout table information that is stored in the display layout condition memory section 102*d* of the RAM 102. Based on this, the CPU 100 displays the screen on display and the display instruction screen simultaneously in accordance with the display layout of the pattern 4 shown in FIG. 8D. Subsequently, the CPU 100 advances to Step SC3 shown in FIG. 14, where it registers the display history information related to the simultaneous display in the display history memory section 102*b* of the RAM 102 and ends the present processing.

g. When Display Layout Condition is "Package Style"

In this case, all judgment results at Steps SC5 to SC6 (see FIG. 14), Steps SC7 to SC9 (see FIG. 15) and Step SC10 (see FIG. 16) as described above are "NO", and the CPU 100 advances to Step SC35 shown in FIG. 16. At Step SC35, the CPU 100 detects the current package style ("open style" or "view style") based on the signal detected by the package style detection section 109. Subsequently, at Step SC36, the CPU 100 judges whether or not the package style that has been detected is "view style".

When the package style is "view style", the judgment result is "YES", and the CPU 100 advances to Step SC37, where the CPU 100 reads out the display layout control data assigned for "view style" from the display layout table information that is stored in the display layout condition memory section 102*d* of the RAM 102. Based on this, the CPU 100 displays the screen on display and the display instruction screen simultaneously in accordance with the display layout for the pattern 3 shown in FIG. 8C. Subsequently, the CPU 100 advances to Step SC3 shown in FIG. 14, where it registers the display history information related to the simultaneous display in the display history memory section 102b of the RAM 102 and ends the present processing.

On the other hand, when the package style that the CPU 100 has detected is "open style", the judgment result at Step SC36 as described above is "NO", and the CPU 100 advances to Step SC38, where the CPU 100 reads out the display layout control data assigned for "open style" from the display layout table information that is stored in the display layout condition memory section 102d of the RAM 102. Based on this, the CPU 100 displays the screen on display and the display instruction screen simultaneously in accordance with the display layout of the pattern 4 shown in FIG. 8D. Subsequently, the CPU 100 advances to Step SC3 shown in FIG. 14, where it registers the display history information related to the simultaneous display in the display history memory section 102b of the RAM 102 and ends the present processing.

As described above, in the display layout identification processing, when it is judged that the screen display instruction operation by the user instructs the simultaneous display, the CPU 100 reads out the display layout condition that is currently employed from the display layout table information stored in the display layout condition memory section 102d of the RAM 102, and controls the display layout for the simultaneous display in accordance with the display layout condition that the CPU 100 has read out and the circumstance when the screen display instruction operation is performed.

As explained so far, according to the present embodiment, the CPU 100 reads out the simultaneous/switch display condition that is currently employed from the display control table information stored in the simultaneous/switch display condition memory section 102c of the RAM 102, and identifies whether the screen display instruction operation instructs the switch display or the simultaneous display in accordance with the simultaneous/switch display condition that the CPU 100 has read out and the circumstance when the screen display instruction operation is performed.

Then, when it is identified that the screen display instruction operation by the user instructs the simultaneous display, the CPU 100 reads out the display layout condition that is currently employed from the display layout table information stored in the display layout condition memory section 102d of the RAM 102, and controls the display layout for the simultaneous display in accordance with the display layout condition that the CPU 100 has read out and the circumstance when the screen display instruction operation is performed. Therefore, the display mode of the screen can be easily and suitably controlled.

In addition, more specific advantageous effects achieved by the present embodiment as described above are as specified in (a) to (m).

(a) The embodiment enables an easy and suitable identification, in accordance with the operation circumstance, of whether to simultaneously display the screen which is being displayed and the screen for which the display instruction is made or to display the screen for which the display instruction is made after switching from the screen which is being displayed.

(b) The embodiment enables an easy and suitable identification, in accordance with the operation circumstance, of the display layout when simultaneously displaying the screen which is being displayed and the screen for which the display instruction is made.

(c) The embodiment enables an easy and suitable identification of the display mode in accordance with the operation time of the display instruction operation of the screen.

(d) The embodiment enables an easy and suitable identification of the display mode in accordance with the number of operations of the display instruction operation of the screen.

(e) The embodiment enables an easy and suitable identification, in accordance with the screen circumstances, of whether to simultaneously display the screen which is being displayed and the screen for which the display instruction is made or to display the screen for which the display instruction is made after switching from the screen which is being displayed.

(f) The embodiment enables an easy and suitable identification, in accordance with the screen circumstances, of the display layout when simultaneously displaying the screen which is being displayed and the screen for which the display instruction is made.

(g) The embodiment enables an easy and suitable identification of the display mode in accordance with the priority order of the screen.

(h) The embodiment enables an easy and suitable identification of the display mode in accordance with the group of the screen.

(i) The embodiment enables an easy and suitable identification of the display mode in accordance with the past display mode of the screen.

(j) The embodiment enables an easy and suitable identification, in accordance with the status of electronic equipment when displaying the screen, of whether to simultaneously display the screen which is being displayed and the screen for which the display instruction is made or to display the screen for which the display instruction is made after switching from the screen which is being displayed.

(k) The embodiment enables an easy and suitable identification, in accordance with the status of electronic equipment when displaying the screen, of the display layout when simultaneously displaying the screen which is being displayed and the screen for which the display instruction is made.

(l) The embodiment enables an easy and suitable identification of the display mode in accordance with connection/non-connection of an external power supply apparatus.

(m) The embodiment enables an easy and suitable identification of the display mode in accordance with the package style of the electronic equipment.

Note that, in the embodiment as described above, when the display layout condition is "display history", the screen on display and the display instruction screen are displayed simultaneously, in accordance with the display layout that is included in the display history information in the previous display of the screen (display instructed screen) for which the display instruction is made by the screen display instruction operation. In place of this, for example, the mode may be such that the display layout of the simultaneous display is identified in accordance with a display history in which the screen for which the display instruction is made and the screen which is being displayed makes a pair.

In addition, in the embodiment as described above, the number of the screen which is being displayed is one to simplify the description. However, the mode may be such that a plurality of screens may be the screens that are displayed.

In addition, in the embodiment as described above, a mobile terminal is used as the terminal apparatus. However, the terminal apparatus is not limited to this example, and other terminal apparatus such as a PDA, a digital camera, an electronic wrist watch, music reproduction equipment or the like may be used.

Furthermore, although the computer program product of the terminal apparatus which is a preferred embodiment of the present invention is stored in the memory (for example, ROM, etc.) of the terminal apparatus, this processing program is stored on a computer-readable medium and should also be protected in the case of manufacturing, selling, etc. of only the program. In that case, the method of protecting the program with a patent will be realized by the form of the computer-readable medium on which the computer program product is stored.

While the present invention has been described with reference to the preferred embodiments, it is intended that the invention be not limited by any of the details of the description therein but includes all the embodiments which fall within the scope of the appended claims.

What is claimed is:

1. A portable terminal apparatus that displays on a display screen a plurality of screens simultaneously, comprising:
   an instruction means for generating, in accordance with an operation for activating a first function, a display instruction of a first screen which is displayed via the first function, the first function including an address book function, an outgoing call history function, an incoming call history function, a digital television function, a digital radio function, an e-mail function, a movie replay function, and a music replay function;
   a judgment means for judging, when the instruction means generates the display instruction while a second screen which has been displayed via a second function is displayed on the display screen, one of (i) an operation time required for the operation for activating the first function and (ii) a number of the operation required for the operation for activating the first function;
   an identification means for identifying a layout pattern for a simultaneous display from a plurality of preset layout patterns for the simultaneous display based on one of the operation time and the number of the operation judged by the judgment means; and
   a display control means for controlling so as to simultaneously display the first screen and the second screen in the layout pattern identified by the identification means.

2. A non-transitory computer-readable storage medium having a program of a portable terminal apparatus including display processing that simultaneously displays a plurality of screens stored thereon that is executable by a computer, comprising:
   instruction processing for generating, in accordance with an operation for activating a first function, a display instruction of a first screen which is displayed via the first function, the first function including an address book function, an outgoing call history function, an incoming call history function, a digital television function, a digital radio function, an e-mail function, a movie replay function, and a music replay function;
   judgment processing for judging, when the instruction processing generates the display instruction while a second screen which has been displayed via a second function is displayed on the display screen, one of (i) an operation time required for the operation for activating the first function and (ii) a number of the operation required for the operation for activating the first function;
   identification processing for identifying a layout pattern for a simultaneous display from a plurality of preset layout patterns for the simultaneous display based on one of the operation time and the number of the operation judged by the judgment processing; and
   display control processing for controlling so as to simultaneously display the first screen and the second screen in the layout pattern identified by the identification processing.

3. The portable terminal apparatus according to claim 1, further comprising:
   a simultaneous switch/display judgment means for judging, when the instruction means generates the display instruction while a second screen is displayed on the display screen, a simultaneous display or a switch display based on one of the operation time and the number of the operation judged by the judgment means;
   wherein the display control means, when the simultaneous/switch display judgment means judges that the simultaneous display controls so as to simultaneously display the first screen and the second screen in the layout pattern identified by the identification means and, when the simultaneous/switch display judgment means judges the switch display, controls so as to switch to and display the first screen as a substitute for the second screen.

4. The portable terminal apparatus according to claim 1, wherein the display control means, based on the operation time of the operation judged by the simultaneous/switch display judgment means, controls so as to simultaneously display the first screen and the second screen in the layout pattern identified by the identification means or controls so as to switch to and display the first screen.

5. The portable terminal apparatus according to claim 1, wherein the display control means, based on the number of the operation judged by the judgment means, controls so as to simultaneously display the first screen and the second screen in the layout pattern identified by the identification means or controls so as to switch to and display the first screen.

* * * * *